(12) United States Patent  
Hall

(10) Patent No.: US 11,130,233 B2
(45) Date of Patent: *Sep. 28, 2021

(54) AUTOMATION WINDOWS FOR ROBOTIC PROCESS AUTOMATION

(71) Applicant: UiPath, Inc., New York, NY (US)

(72) Inventor: Andrew Hall, Bellevue, WA (US)

(73) Assignee: UiPath, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/989,064

(22) Filed: Aug. 10, 2020

(65) Prior Publication Data

US 2021/0252704 A1    Aug. 19, 2021

Related U.S. Application Data

(63) Continuation of application No. 16/874,593, filed on May 14, 2020, which is a continuation of application (Continued)

(51) Int. Cl.
*G06F 3/00* (2006.01)
*B25J 9/16* (2006.01)
*G06F 9/54* (2006.01)

(52) U.S. Cl.
CPC ............... *B25J 9/1661* (2013.01); *G06F 9/54* (2013.01); *G06F 9/542* (2013.01); *G05B 2219/31124* (2013.01); *G05B 2219/50391* (2013.01)

(58) Field of Classification Search
CPC .......................... G06F 9/54; G05B 2219/50391
(Continued)

(56) References Cited

U.S. PATENT DOCUMENTS 7,013,465 B1    3/2006  Taylor et al.
9,552,056 B1    1/2017  Barry et al.
(Continued)

FOREIGN PATENT DOCUMENTS

CN    107666987 A    2/2018
CN    109636504 A    4/2019
(Continued)

OTHER PUBLICATIONS

Radoslaw Dukalski, Portable rapid visual workflow simulation tool for human robot coproduction. (Year: 2017).*
(Continued)

*Primary Examiner* — Lechi Truong
(74) *Attorney, Agent, or Firm* — LeonardPatel PC; Michael A. Leonard, II; Sheetal S. Patel

(57) ABSTRACT

Automation windows for robotic process automation (RPA) for attended or unattended robots are disclosed. A child session is created and hosted as a window including the user interfaces (UIs) of applications of a window associated with a parent session. Running multiple sessions allows a robot to operate in this child session while the user interacts with the parent session. The user may thus be able to interact with applications that the robot is not using or the user and the robot may be able to interact with the same application if that application is capable of this functionality. The user and the robot are both interacting with the same application instances and file system. Changes made via the robot and the user in an application will be made as if a single user made them, rather than having the user and the robot each work with separate versions of the applications and file systems.

19 Claims, 22 Drawing Sheets

Related U.S. Application Data

No. 16/793,064, filed on Feb. 18, 2020, now Pat. No. 10,654,166.

(58) Field of Classification Search
USPC .......................................................... 719/310
See application file for complete search history.

(56) References Cited

U.S. PATENT DOCUMENTS

| | | | |
|---|---|---|---|
| 10,324,457 B2 | 6/2019 | Neelakandan et al. | |
| 10,339,027 B2 | 7/2019 | Garcia et al. | |
| 10,503,627 B2 | 12/2019 | Radhakrishnan et al. | |
| 10,654,166 B1 | 5/2020 | Hall | |
| 2002/0105296 A1 | 8/2002 | Okuyama et al. | |
| 2004/0015266 A1 | 1/2004 | Skoog | |
| 2005/0262052 A1 | 11/2005 | Daniels et al. | |
| 2006/0184293 A1 | 8/2006 | Konandreas et al. | |
| 2010/0076600 A1 | 3/2010 | Cross et al. | |
| 2013/0297678 A1* | 11/2013 | Schach | G06F 9/54 709/203 |
| 2015/0363224 A1 | 12/2015 | Argenti et al. | |
| 2016/0288322 A1 | 10/2016 | Lin et al. | |
| 2017/0052824 A1 | 2/2017 | Sharma et al. | |
| 2017/0076194 A1 | 3/2017 | Versace et al. | |
| 2017/0295243 A1 | 10/2017 | Kim | |
| 2018/0074931 A1 | 3/2018 | Garcia et al. | |
| 2018/0121217 A1 | 5/2018 | Jarabek et al. | |
| 2018/0197123 A1 | 7/2018 | Parimelazhagan et al. | |
| 2018/0370033 A1 | 12/2018 | Geffen et al. | |
| 2019/0004932 A1 | 1/2019 | Misra et al. | |
| 2019/0022856 A1 | 1/2019 | Kulläng | |
| 2019/0122200 A1 | 4/2019 | Kurian | |
| 2019/0129824 A1 | 5/2019 | Radhakrishnan et al. | |
| 2019/0132229 A1 | 5/2019 | McCormack et al. | |
| 2019/0138600 A1 | 5/2019 | Krishnan et al. | |
| 2019/0155225 A1 | 5/2019 | Kothandaraman et al. | |
| 2019/0171845 A1 | 6/2019 | Dotan-Cohen et al. | |
| 2019/0215283 A1 | 7/2019 | Nahum et al. | |
| 2019/0303779 A1 | 10/2019 | Briggle et al. | |
| 2020/0001471 A1 | 1/2020 | Chen et al. | |
| 2020/0019283 A1 | 1/2020 | Nychis et al. | |
| 2020/0180155 A1 | 6/2020 | Hall | |
| 2020/0213422 A1 | 7/2020 | Pandya et al. | |
| 2020/0348960 A1* | 11/2020 | Krishnamurthy | G06F 9/485 |
| 2020/0348964 A1 | 11/2020 | Anand et al. | |

FOREIGN PATENT DOCUMENTS

| | | |
|---|---|---|
| CN | 201910345536 A | 7/2019 |
| CN | 110648054 A | 1/2020 |
| JP | 5607741 B2 | 10/2014 |
| JP | 2018535459 A | 11/2018 |
| JP | 6532626 B1 | 6/2019 |
| JP | 2019159556 A | 9/2019 |
| JP | 2019169044 A | 10/2019 |
| JP | 2020003905 A | 1/2020 |
| JP | 202000017099 | 1/2020 |
| JP | 2020092400 A | 6/2020 |
| KR | 1020180123513 A | 11/2018 |
| WO | 2017176917 A1 | 10/2017 |

OTHER PUBLICATIONS

Abdou K Seye, "Non-Final Office Action", dated Nov. 6, 2020, U.S. Appl. No. 16/924,910.

David Gauthier, et al. "Interprocess Communication for Distributed Robotics", (Year: 1987).

International Search Report and Written Opinion of the International Search Authority issued in PCT Application No. PCT/US2020/039886 dated Nov. 6, 2020.

Microfocus RPA Architecture page available at https://docs.microfocus.com/itom/Robotic_Process_Automation:2019.07/RPAArch> (last accessed Dec. 30, 2020).

Notice of Allowance issued in Korean Application No. 10-2020-0101943 dated Dec. 23, 2020.

"17th Annual Meeting in Shimane Prefectural CIO Forum RPA Technologies Autonomy Introducing RPA that succeeds with the body Why is it easy to deploy horizontally even at a small start?," Nikkei BP Government Technology, Fall 2019 (No. 40), Nikkei BP, pp. 32 and 33 (Oct. 2019).

"Special feature RPA maxim 3 Forefront of tools and technology 5 maxims to prevent failure It's not dangerous if you know the rules," Nikkei Computer, Issue No. 979, Nikkei BP, pp. 32 and 33, ISSN 0285-4619 (Dec. 6, 2018).

"Special feature: Production RPA 2 Tool enhancement 3 selection points," Nikkei Computer Data, issue No. 952, Nikkei BP, pp. 30-33, ISSN: 0285-4619 (Nov. 23, 2017).

Kenichi Kawai, "Introduction to OS / 2," First Edition, Baifukan Co., Ltd., pp. 144-152, ISBN: 4-563-01340-4 (Jun. 30, 1988).

Notification of Reasons for Refusal issued in Japanese Patent Application No. 2020-125401 dated Dec. 15, 2020.

Official Letter and Search Report issued by the Taiwan Intellectual Property Office (TIPO) dated Jan. 29, 2021.

Shinichi Hoshi, "Let's Warp, OS/2 Programming 3rd Multitasking System's Interprocess Communication," DDJ (Dr. Dobb's Journal Japan), Shoeisha Co., Ltd., pp. 170-176 (Jul. 1, 1995).

Sumi Takano, "How to create a parallel program in OS / 2 (I)," Information Processing, vol. 31, No. 10, Information Processing Society of Japan, pp. 1425-1432, ISS: 0447-8053 (Oct. 15, 1990).

U.S. Appl. No. 15/930,906, filed May 13, 2020, Andrew Hall.

U.S. Appl. No. 16/924,910, filed Jul. 9, 2020, Daniel Dines.

U.S. Appl. No. 16/925,544, filed Jul. 20, 2020, Daniel Dines.

AI Multiple Robotic Desktop Automation Guide available at https://blog.aimultiple.com/rda/ (Jan. 1, 2020).

ICS Analytics NICE Desktop Automation Whitepaper available at https://www.icsanalytics.com/wp-content/uploads/2018/10/NICE-Desktop-Automation-Whitepaper-ICS-Analytics.pdf(last accessed Feb. 18, 2020).

Inter-Bot Communication / Delegation Guide available at https://botpress.com/docs/tutorials/interbot (last accessed May 11, 2020).

Lechi Truong, "Notice of Allowance", dated Apr. 13, 2020, U.S. Appl. No. 16/793,064.

Microsoft Child Sessions documentation page available at https://docs.microsoft.com/en-us/windows/win32/termserv/child-sessions (May 31, 2018).

NICE RPA brochure available at nice.com/rpa/assets/NICE_Advanced_Process_Automation-Brochure_2018.pdf (last accessed May 11, 2020).

NICE RPA chatbot page available nice.com/engage/blog/chatbots--robotic-automation--a-match-made-in-heaven-2315/ (last accessed May 11, 2020).

NICE RPA page available at nice.com/rpa/robotic-automation/ (last accessed Jun. 15, 2020).

PWC Robotic Process Automation in a Virtual Environment brochure available at https://www.pwc.in/assets/pdfs/publications/2018/robotic-process-automation-in-a-virtual-environment.pdf(May 2018).

UiPath Extension for Windows Remote Desktop page available at https://docs.uipath.com/studio/docs/extension-for-windows-remote-desktop (last accessed Feb. 14, 2020).

UiPath Robot Agent documentation available at https://docs.uipath.com/robot/docs/robot-agent (last accessed Feb. 14, 2020).

European Search Report issued in EP Application No. 20199147 dated Mar. 11, 2021.

European Search Report issued in EP Application No. 20199191 dated Mar. 12, 2021.

Jennifer L. Casper, Workflow Study on Human-Robot Interaction in USAR. (Year: 2002).

Lechi Truong, "Non-Final Office Action", dated Jun. 24, 2021, U.S. Appl. No. 15/930,906.

Michele Amoretti et al., "Architectural paradigms for robotics applications," Advanced Engineering Informatics, vol. 24, No. 1, pp. 4-13 (Jan. 1, 2010).

Notice of Allowance issued in Taiwanese Application No. 109124314 dated May 4, 2021.

"Robotic Desktop Automation in 2021: In-depth Guide," available at https://research.aimultiple.com/rda/ (last accessed Mar. 22, 2021).

(56) References Cited

OTHER PUBLICATIONS

"Robotic process automation in a virtual environment," available pwc.in/assets/pdfs/publications/2018/robotic-process-automation-in-a-virtual-environment.pdf (last accessed Mar. 22, 2021).

"Unpacking the Intelligent Technology Powering NEVA (NICE Employee Virtual Attendant," available at icsanalytics.com/wp-content/uploads/2018/10/NICE-Desktop-Automation-Whitepaper-ICS-Analytics.pdf (Oct. 1, 2018).

Abdou K Seye, "Final Office Action", dated Mar. 26, 2021, U.S. Appl. No. 16/924,910.

Examination Report issued in EP Application No. 20197271.8 dated Mar. 25, 2021.

International Search Report & Written Opinion, dated Apr. 1, 2021, PCT Application No. PCT/US20/63951.

International Search Report & Written Opinion, dated Apr. 8, 2021, PCT Application No. PCT/US20/51940.

International Search Report & Written Opinion, PCT Application No. PCT/US20/63964.

International Search Report and Written Opinion of the International Search Authority issued for PCT Application No. PCT/US2020/063912 dated Mar. 18, 2021.

International Search Report and Written Opinion of the International Search Authority issued for PCT Application No. PCT/US2020/063921 dated Mar. 18, 2021.

International Search Report and Written Opinion of the International Search Authority issued in PCT Application No. PCT/US2020/051938 dated Mar. 26, 2021.

Lechi Truong, "Non-Final Office Action", dated Apr. 15, 2021, U.S. Appl. No. 16/874,593.

Pall Jensson, "Robotic Process Automation: Dynamic Roadmap for Successful Implementation" (2018).

Supplementary European Search Report issued for EP Application No. 20197271.8 dated Feb. 26, 2021.

Lechi Truong, "Notice of Allowance", dated Jul. 29, 2021, U.S. Appl. No. 16/874,593.

Quang-Vinh Dang, Scheduling a single mobile robot for part-feeding tasks of production lines. (Year: 2014).

Notice of Allowance issued in Japanese Patent Application No. 2020-125401 dated Aug. 4, 2021.

"About Session 0", Teratail [online], Leverages Co., Ltd., 201 Aug. 6, 2006, [search on Jul. 21, 3rd year of Reiwa], https://teratail.com/questions/6404.

"Connecting to a Console Session with Windows Remote Desktop", Tech TIPS-@IT, [online], ITmedia, Inc., Apr. 10, 2009 [Jul. 21, Reiwa 3], atmarkit.co.jp/ait/articles/0501/15/news014.html.

* cited by examiner

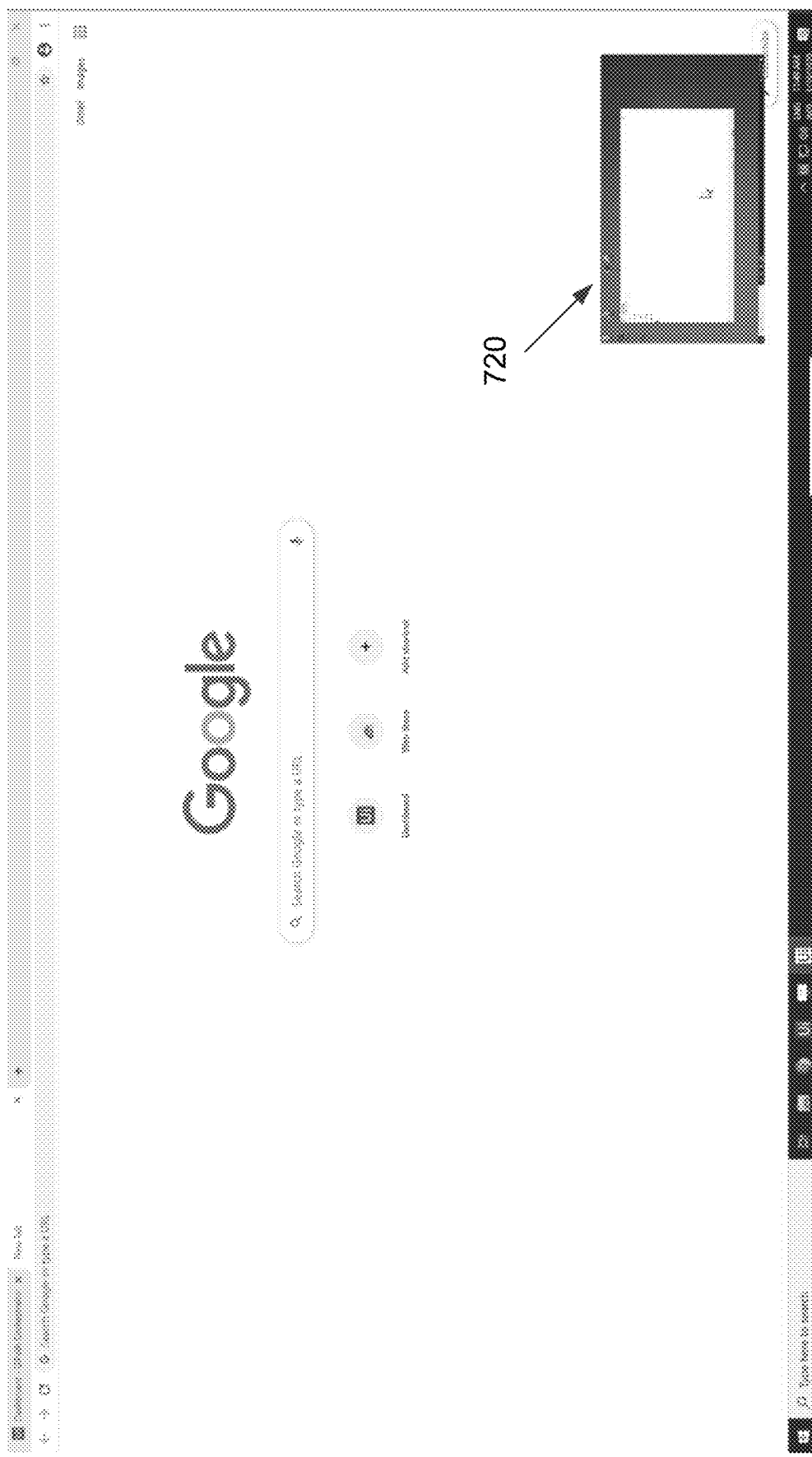

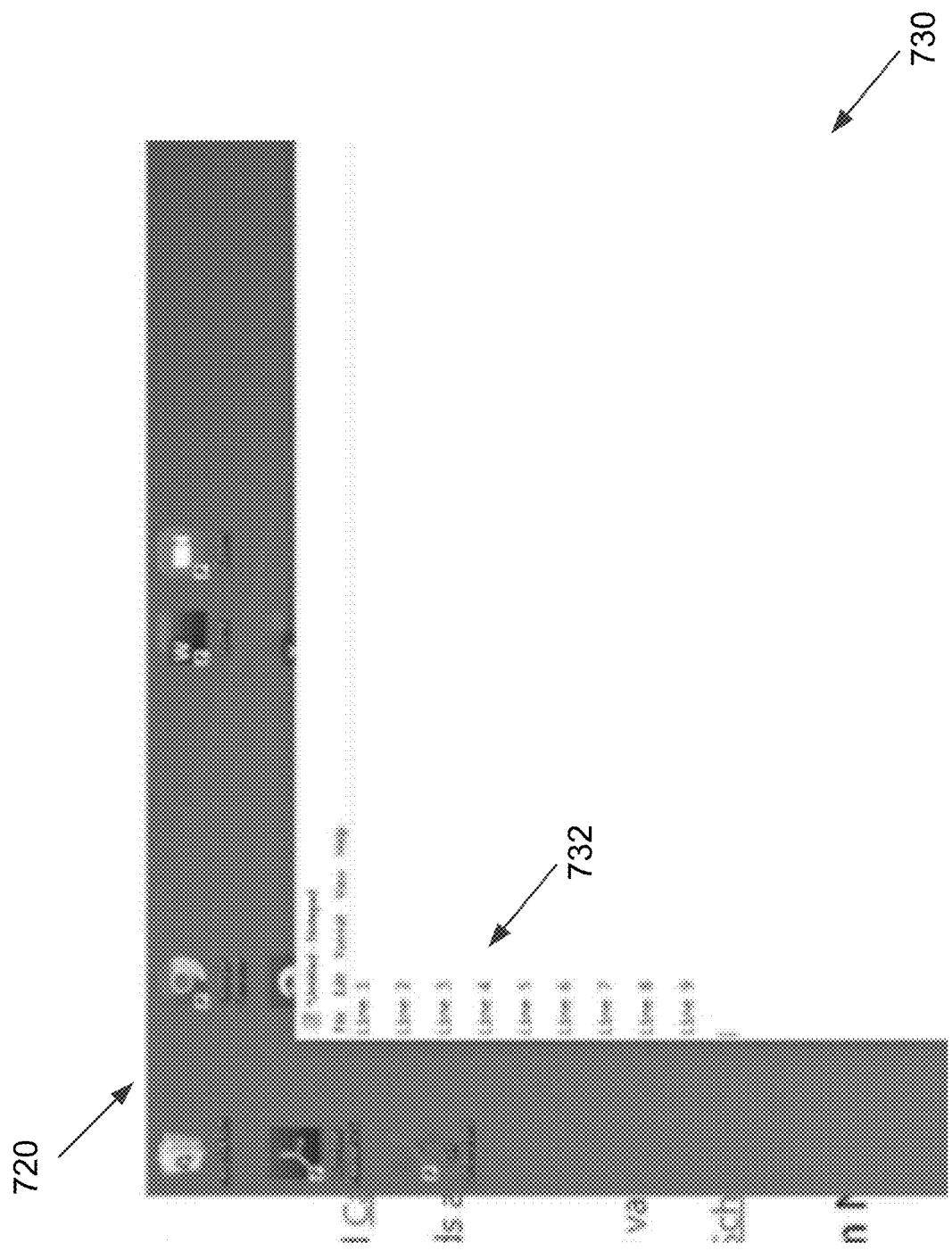

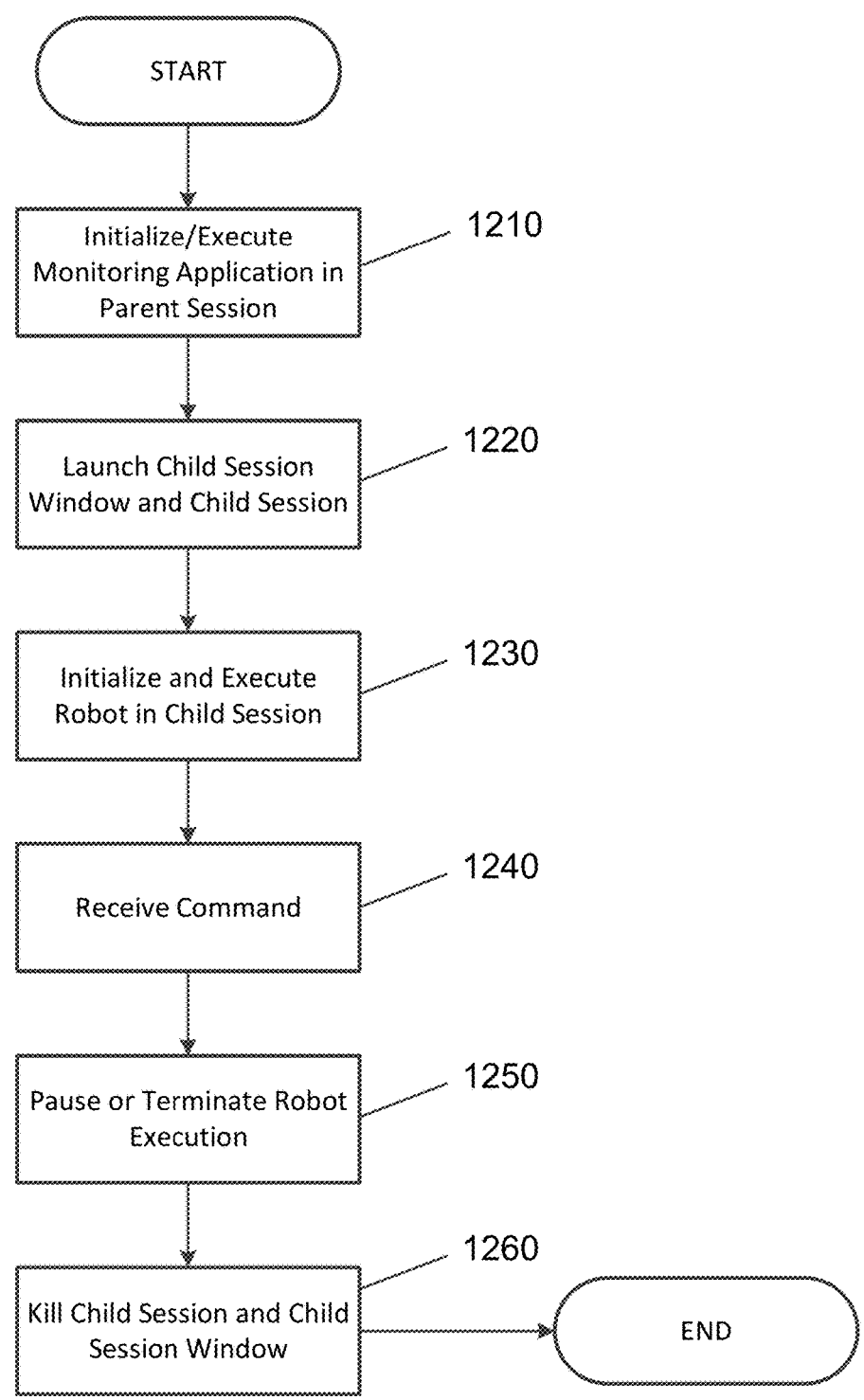

AUTOMATION WINDOWS FOR ROBOTIC PROCESS AUTOMATION

CROSS REFERENCE TO RELATED APPLICATION

This application is a continuation of, and claims the benefit of, U.S. Nonprovisional patent application Ser. No. 16/874,593, filed May 14, 2020, which is a continuation of U.S. Nonprovisional patent application Ser. No. 16/793,064 filed Feb. 18, 2020. The subject matter of this earlier filed application is hereby incorporated by reference in its entirety.

FIELD

The present invention generally relates to robotic process automation (RPA), and more specifically, to automation windows for RPA for attended or unattended robots.

BACKGROUND

Attended automation robots run on a computing system operated by a user. An issue that can arise in attended automation scenarios is that the robot may "take over" the user's computing system while the user is trying to interact with the computing system. In other words, the robot controls applications through the user interface (UI) in the same manner that the user would (e.g., simulating mouse clicks and keyboard input).

Various technologies exist that create complete or partial copies of an operating system or the applications running thereon. Emulators have been around for decades and may provide developers with the ability to test and debug applications. For instance, emulators may provide developers with the ability to test and debug mobile applications that use an operating system that does not support running development tools directly. Both Android® and iOS® offer emulators that can be run from a development machine to test and debug an Android® or iOS® application since the developer tools cannot be natively run on those mobile operating systems.

Simulators allow a developer to host a window on his or her local machine that lets the developer test and debug behavior of an application that are difficult or impossible to perform on a development machine. For example, simulators allow the developer to click a button to rotate the simulator, which tells the application running inside the simulator the device has been rotated for the purposes of testing and debugging application behavior that responds to these events. Another common example is multi-touch. Many developer machines do not support touch, so the simulator lets the developer test and debug how the application responds to multiple touch points. Android® and iOS® emulators also offer simulation capabilities. Furthermore, Microsoft® offers a simulator for their Universal Windows Platform (UWP) applications.

Virtual machines host a second operating system on the machine and can be opened and monitored through a window. This runs a completely different operating system and shares the hardware with the host machine. The "guest" machine must have its own copies of applications installed and does not share common resources or files with the user machine.

Docker® containers are conceptually a hybrid form of virtual machine. All of the applications that need to be executed are packaged into an immutable package that is executed directly on the host operating system. The package is not a complete copy of another operating system, but it does not by default share or have access to any of the applications or resources on the host machine. Thus, from a user experience perspective, Docker® containers feel similar to a virtual machine, but technically, the containers are not executing on a completely separate operating system.

However, conventional emulators, simulators, virtual machines (VMs), and hybrid VMs providing operating system (OS)-level virtualization (e.g., Docker® containers) do not address the issues that arise with attended automation robots operating on the same computing system as the user. Thus, the user essentially becomes a spectator for his or her own computing system, watching the robot work and being unable to interact with other applications on the machine that require user interaction. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to automation windows for RPA for attended or unattended robots.

In an embodiment, a computer program is embodied on a non-transitory computer-readable medium. The program is configured to cause at least one processor to launch a child session window and a child session. The child session is a child of a parent session for an operating system and the child window is located within a parent window of the parent session. The program is also configured to cause the at least one processor to launch a user session window on a user computing system, launch a robot session window for a robot session as a child window of the user session window, initialize an RPA robot in the robot child session as a process, and execute the RPA robot. During execution, the RPA robot executes an RPA workflow including a plurality of activities within the child session window. The parent session and the child session have access to a common file system.

In another embodiment, a computer-implemented method for performing attended automation for RPA at design time includes launching a child session window and a child session from an integrated development environment (IDE). The child session is a child of a parent session for an operating system and the child window is located within a parent window of the parent session. The computer-implemented method also includes initializing an RPA robot in the child session as a process and executing the RPA robot. During execution, the RPA robot executes an RPA workflow including a plurality of activities within the child session window. The parent session and the child session have access to a common file system.

In yet another embodiment, a computer-implemented method for automation monitoring in RPA includes initializing and executing a monitoring and troubleshooting application in a parent session associated with a computing system. The computer-implemented method also includes launching a child session window and a child session. The child session is a child of the parent session for an operating system. The computer-implemented method further includes initializing and executing an unattended RPA robot in the child session as a process, receiving a command from a user of the monitoring and troubleshooting application to terminate operation of the unattended RPA robot, and pausing or terminating the operation of the unattended RPA robot responsive to receiving the command. The parent session and the child session have access to a common file system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A-K are screenshots illustrating an example of separate sessions for a user and a robot for RPA, according to an embodiment of the present invention.

FIG. 12 is a flowchart illustrating a process for performing automation monitoring, according to an embodiment of the present invention.

Unless otherwise indicated, similar reference characters denote corresponding features consistently throughout the attached drawings.

DETAILED DESCRIPTION OF THE EMBODIMENTS

Figure 1:
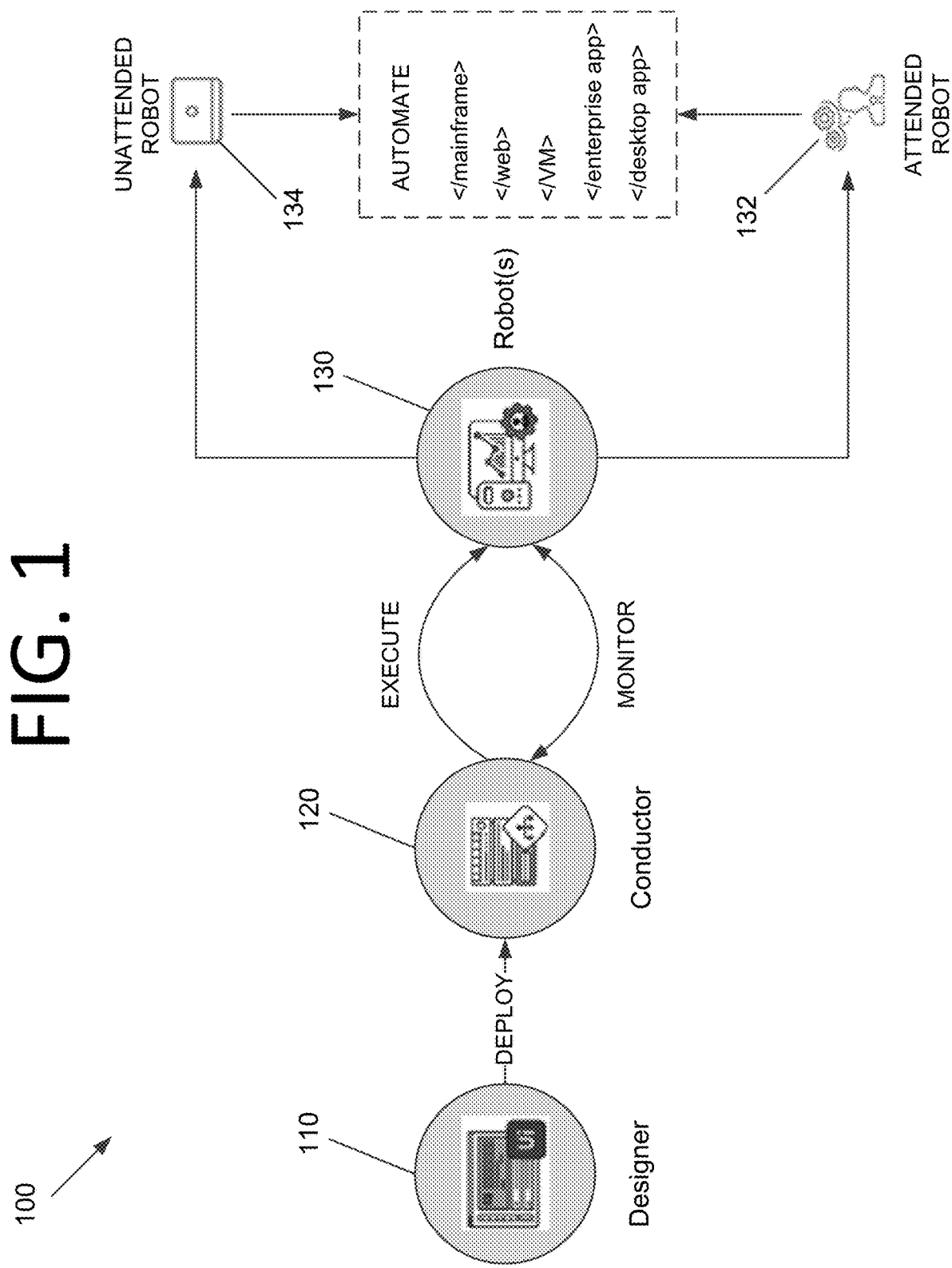
FIG. 1 is an architectural diagram illustrating a robotic process automation (RPA) system, according to an embodiment of the present invention.

Some embodiments pertain to automation windows for RPA for attended or unattended robots. In some embodiments, automation windows are used for attended automation. However, in some embodiments, and as discussed below, automation windows may be used for monitoring unattended robots, such as when an operations engineer remotely monitors one or more robots executing on a server. Applications for automation windows include, but are not limited to, emulators, simulators, VMs, and hybrid VMs providing OS-level virtualization (e.g., Docker® containers). Some embodiments create and host a second (e.g., child) session as a window including the UIs of applications being controlled by an attended automation process. As used herein, a "window" may apply to a window representing a UI shown within the main UI, a second screen of a second display of a computing system, a virtual desktop, an isolated environment (i.e., a window (referred to as the "host") that draws the UIs of all applications launched inside the environment (referred to as "children") and runs them in the context of the host session), etc. without deviating from the scope of the invention.

Running multiple sessions allows the robot to operate in this second session while the user interacts with a first session (e.g., a parent session). Alternatively, the robot may operate in the first session while the user operates in the second session. The user may thus be able to interact with applications that the robot is not using (e.g., the user could use Outlook® while the robot is moving data from Excel® to a web browser), or the user and the robot may be able to interact with the same application if that application is capable of this functionality (e.g., the robot is interacting with one instance in a web browser while the user interacts with another instance).

The user and the robot are both interacting with the same application installations and file system. Changes made via the robot and the user in an application will be made as if a single user made them, rather than having the user and the robot each work with separate versions of the applications and file systems. In other words, the applications are the user's local Excel®, Outlook®, etc. Also, the local file system may be utilized with no additional configuration. This differs from a Docker® container, for example, which requires an additional configuration step to have access to the file system.

In some embodiments, any desired number of sessions for any number of robots may be created and used without deviating from the scope of the invention. For instance, a user may interact with a first session, a first robot may interact with a second session, a second robot may interact with a third session, etc. In certain embodiments, multiple robots may interact with a single session.

The functionality for creating the session may be implemented via Windows® Terminal Services Child Sessions, for example, which can create a session back into a user's own machine without the user having to log out. The newly created session appears as a child window and contains and launches applications that exist in the user's session. In other words, the separation between the user and the robot occurs at the UI level. If a file is deleted, for example, this occurs across all sessions running on the computing system.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level ins some embodiments. For applications that are DPI-unaware or intentionally marked as unaware, DPI may be disabled in some embodiments.

Figure 2:
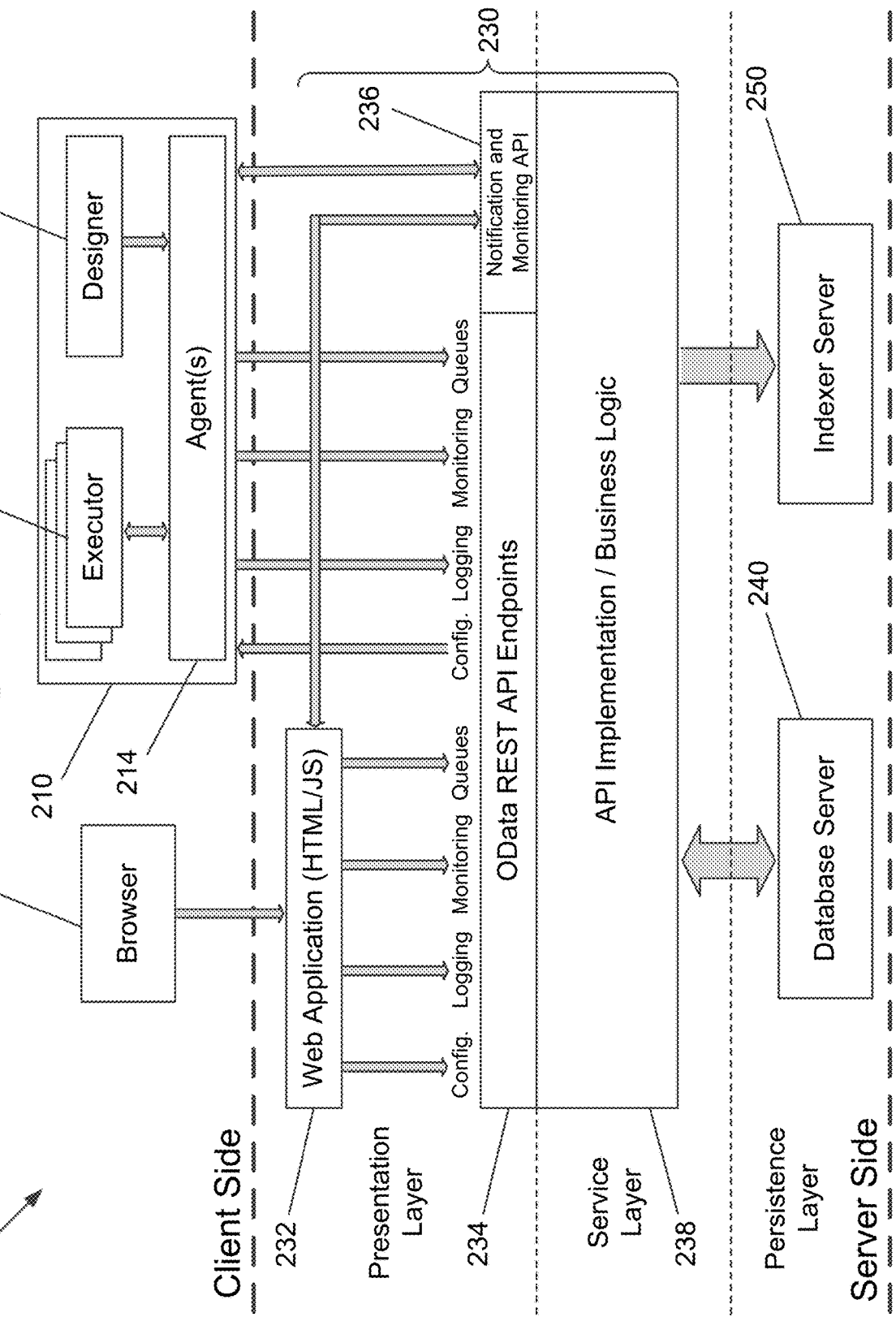
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
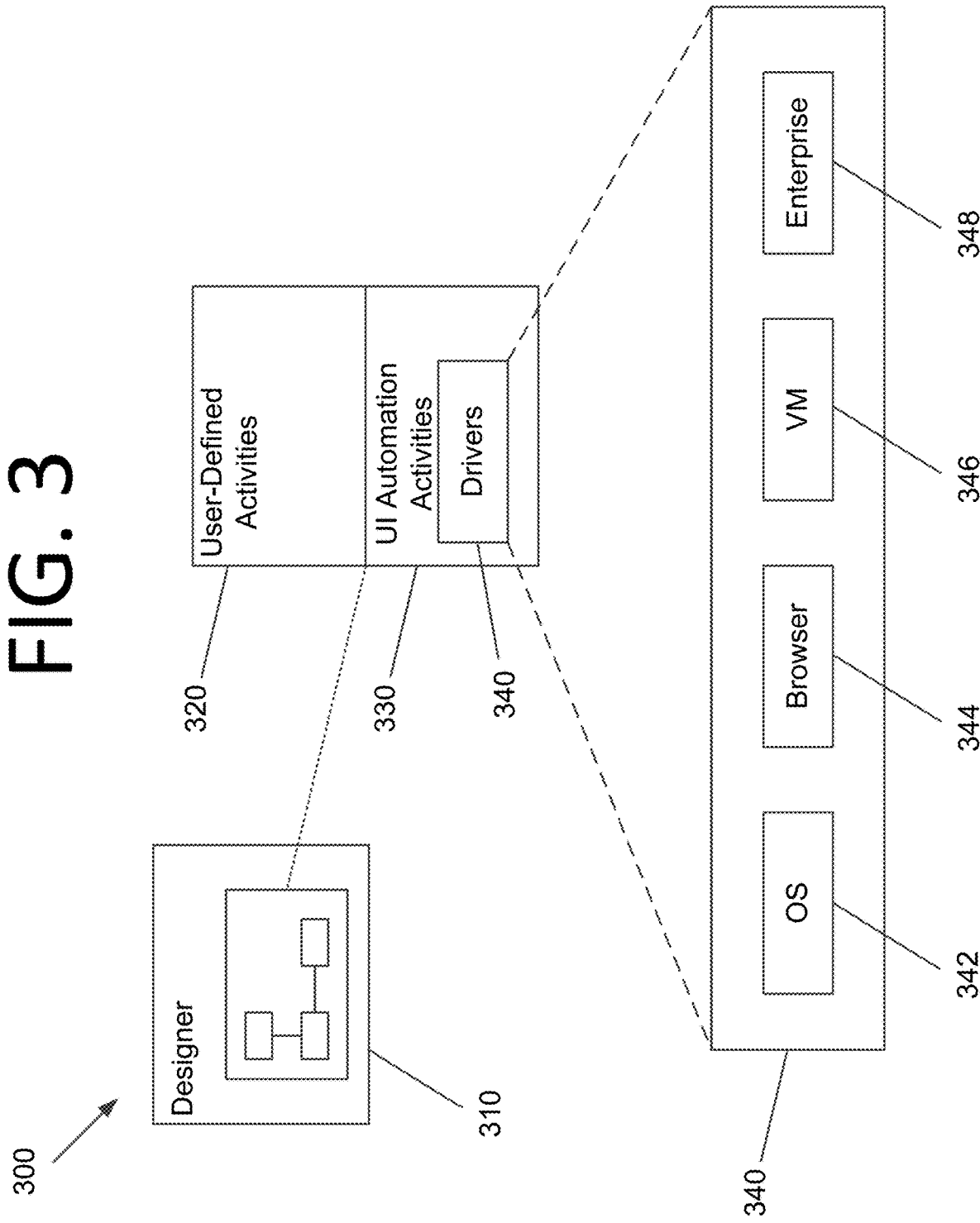
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
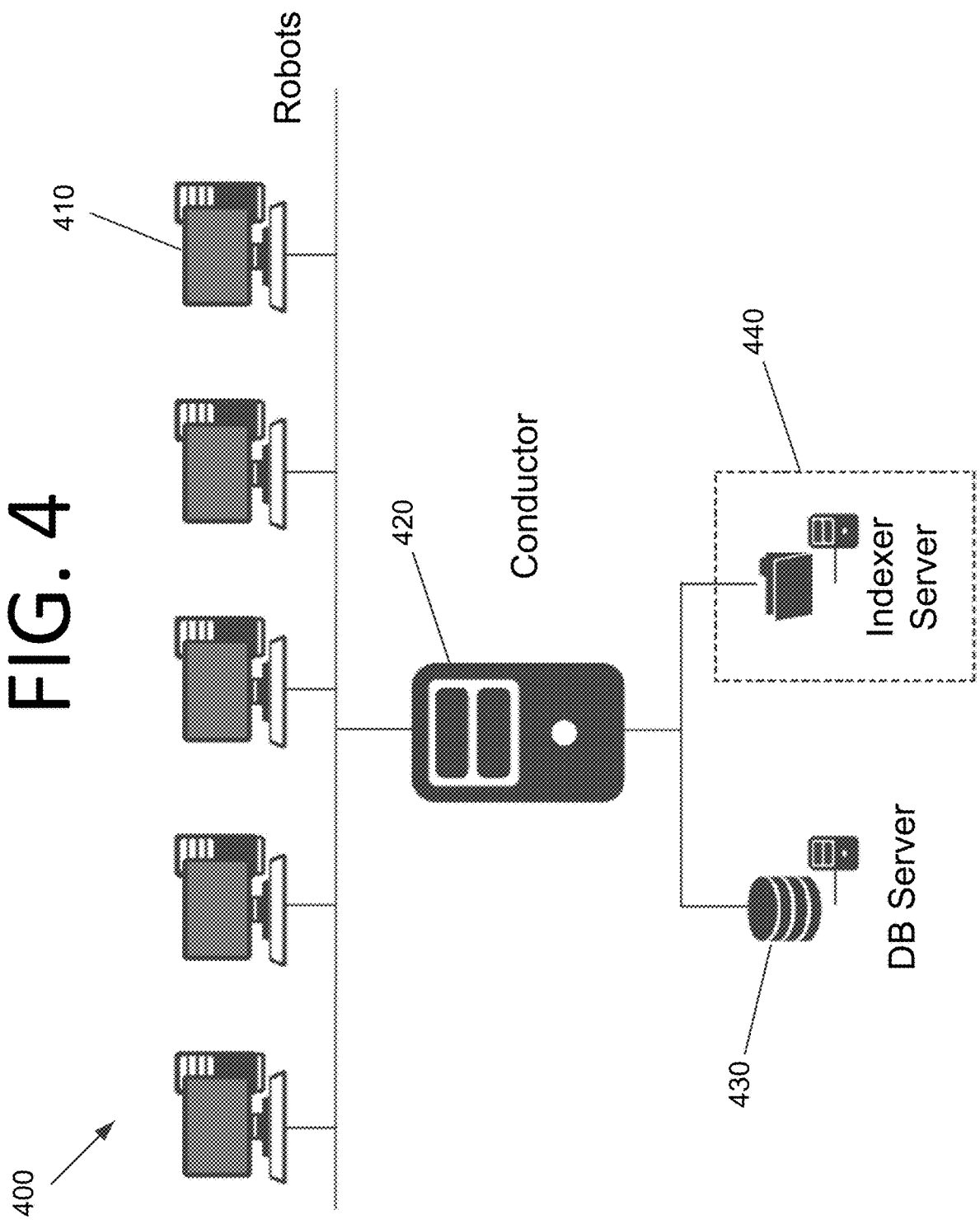
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
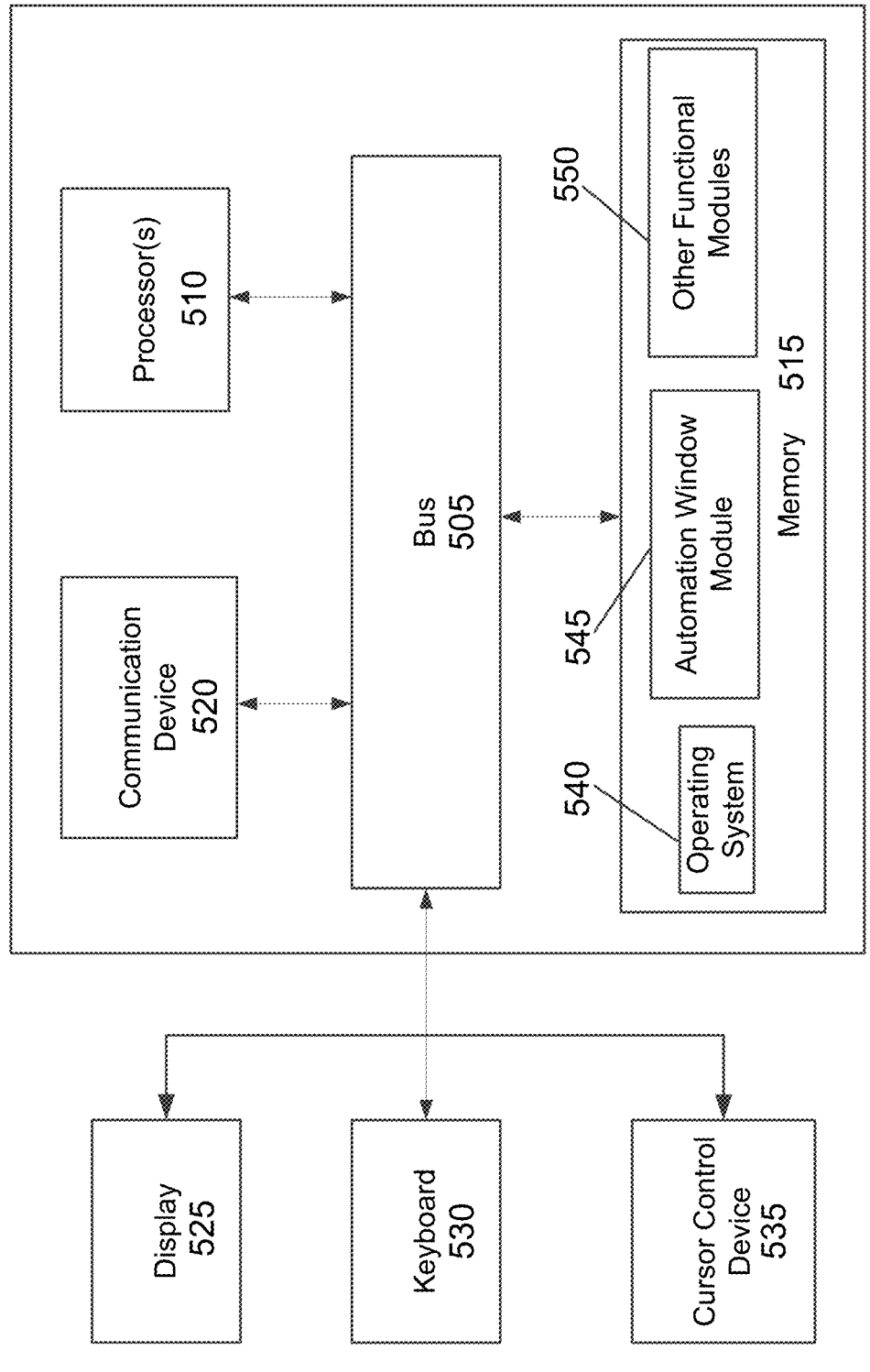
FIG. 5 is an architectural diagram illustrating a computing system configured to execute automation windows for RPA, according to an embodiment of the present invention.

FIG. 5 is an architectural diagram illustrating a computing system 500 configured to execute automation windows for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automation window module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Attended Automation for Users (Runtime)

Per the above, in attended automation, a robot works alongside a user on the same computing system. Since robots in RPA often interact with the computing system in a similar manner (e.g., generating mouse click and key press events, simulating these events via APIs (e.g., using window messages), etc.), some embodiments create a second session to host and run attended automations therein. Unlike existing RPA systems, users can benefit from the ability to interact with their computing system while the robot is running attended automations in the second session. The user may still monitor what the robot is doing and interact with the robot through the host automation window for the second session. This effectively evolves the RPA robot from merely doing tasks faster and more reliably than the user to becoming a true digital assistant that can perform work in parallel with the user, providing an even greater productivity boost. In some embodiments, the first and second session may be running on a remote machine that is controlled by the user's computing system.

In certain embodiments, the RPA robot may be running on a user's computing system and driving a remote computing system through the remote runtime (e.g., via UiPath Remote Runtime™). UiPath Remote Runtime™ is a component that facilitates the communication between a remote application or desktop, such as Citrix Virtual Apps and Desktops™, and the dedicated UiPath® extension (e.g., the UiPath® extension for Citrix® or the UiPath® extension for Windows® Remote Desktop). UiPath Remote Runtime™ gathers information pertaining to targeted UI elements of remote applications and sends this information to the corresponding extension so that selectors are natively generated in UI Explorer™.

Figure 6:
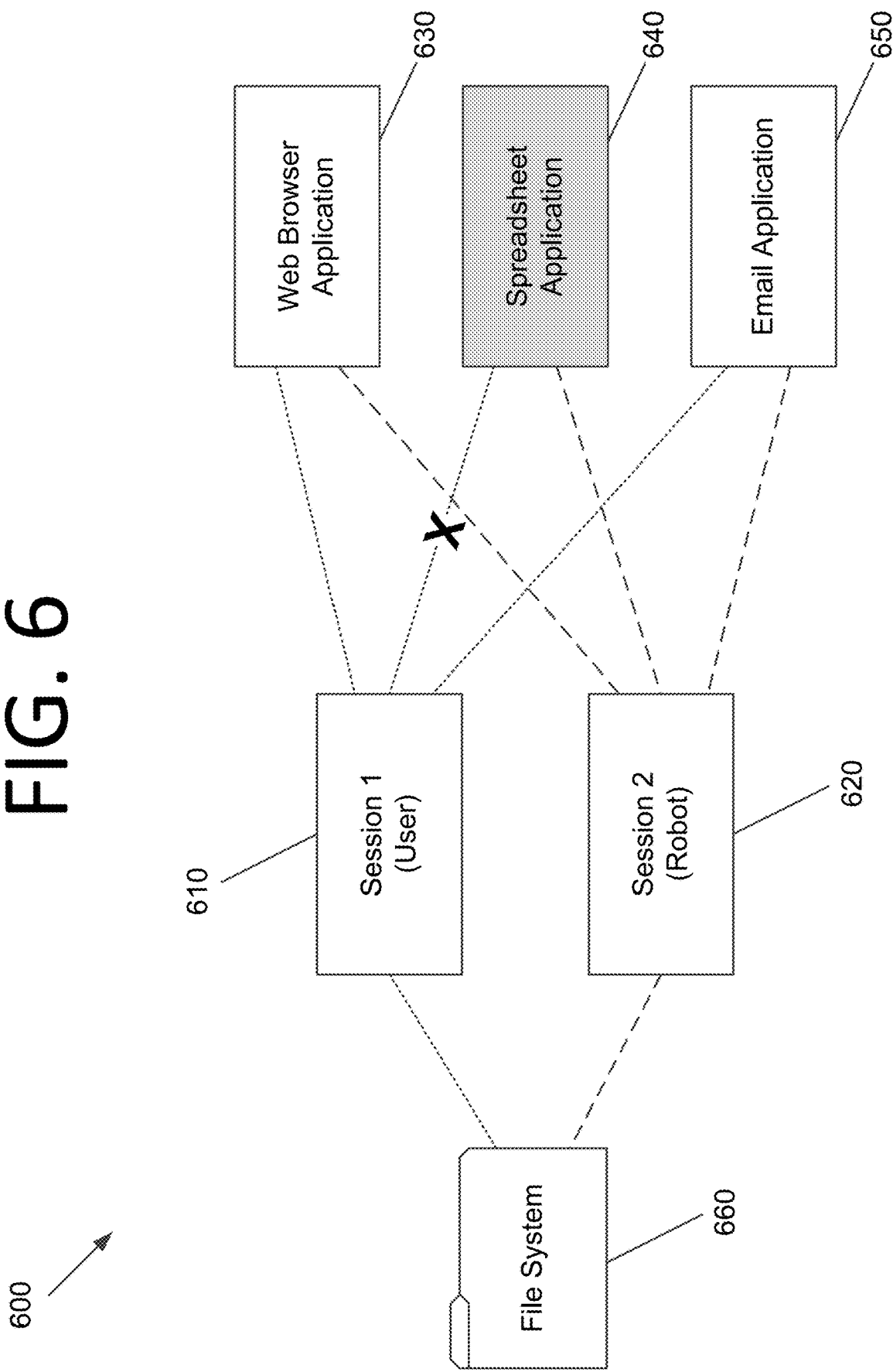
FIG. 6 illustrates some applications of a user computing system running user and attended automation robot sessions with some applications also running on the user computing system, according to an embodiment of the present invention.

As stated previously, the user and the robot are both interacting with the same application instances and file system. FIG. 6 illustrates some applications of a user computing system 600 running a user session 610 and an attended automation robot session 620 with some applications also running on user computing system 600, according to an embodiment of the present invention. As can be seen in FIG. 6, web browser application 630, spreadsheet application 640, and email application 650 are accessible by both user session 610 and attended automation robot session 620. User session 610 and attended automation robot session 620 can interact with web browser application 630 and email application 650 at the same time.

However, when the robot is interacting with the same file of a spreadsheet application 640, the user cannot interact with this application (e.g., the user may only be able to open a "read only" view or the user may be prevented from opening the file entirely). The user may receive a message indicating that spreadsheet application 640 is locked, is being accessed by another "user" (i.e., the robot), etc. Both user session 610 and attended automation robot session 620 can also interact with file system 660. Thus, changes made via the robot and the user in an application via their respective sessions will be made as if a single user made them, rather than having the user and the robot each work with separate versions of the applications and file systems.

Figure 7A:
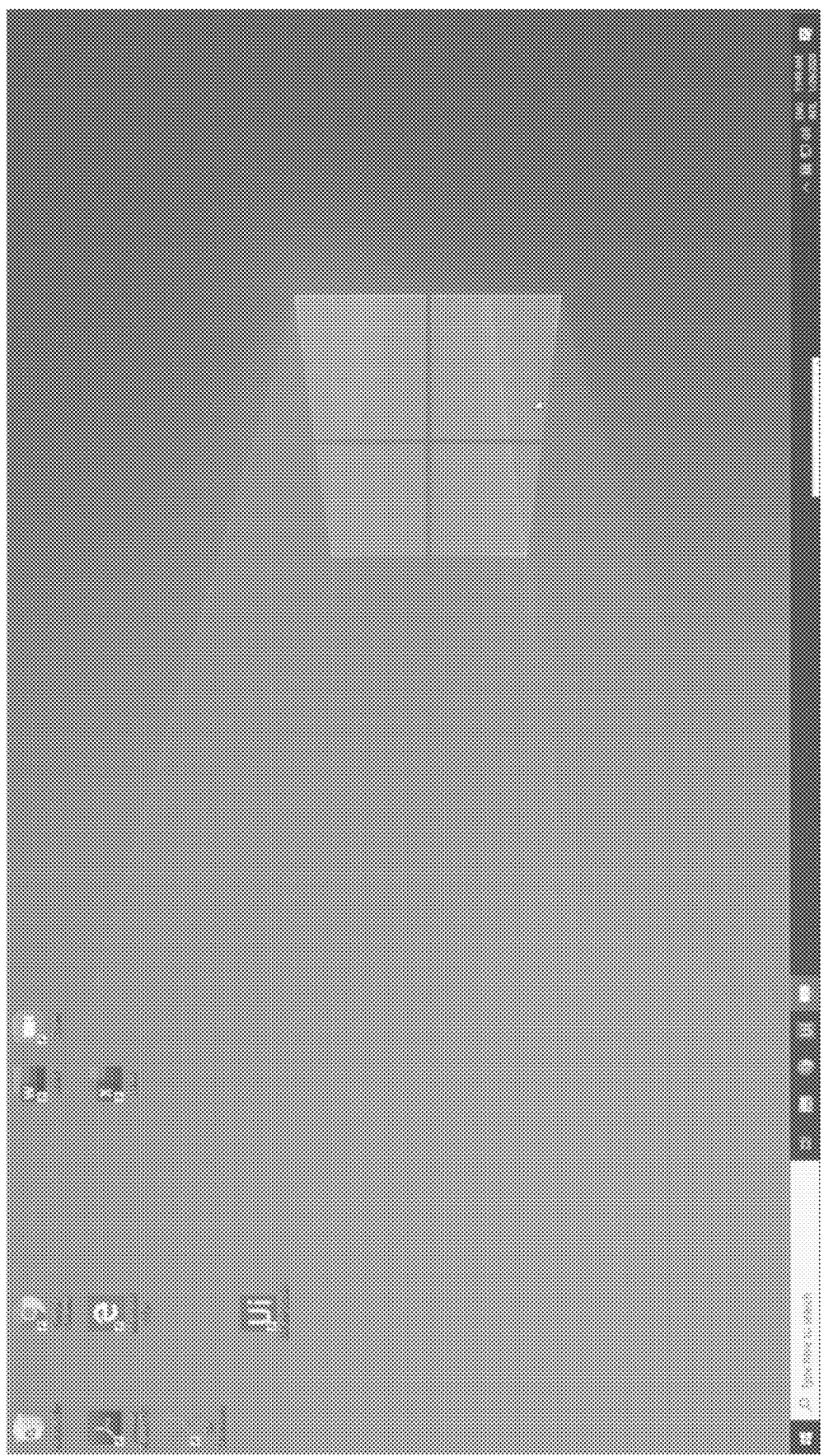
Figure 7B:
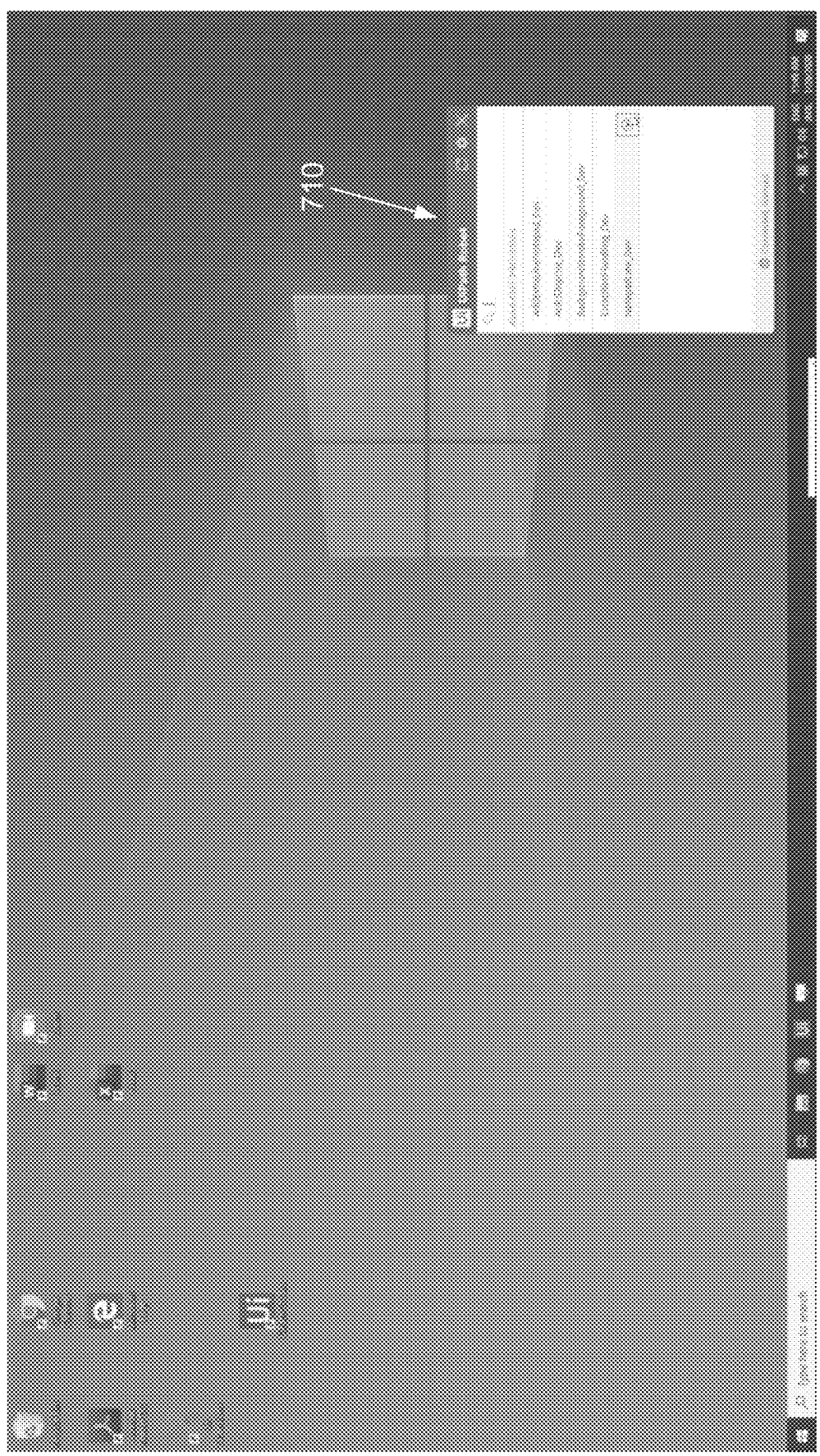
Figure 7C:
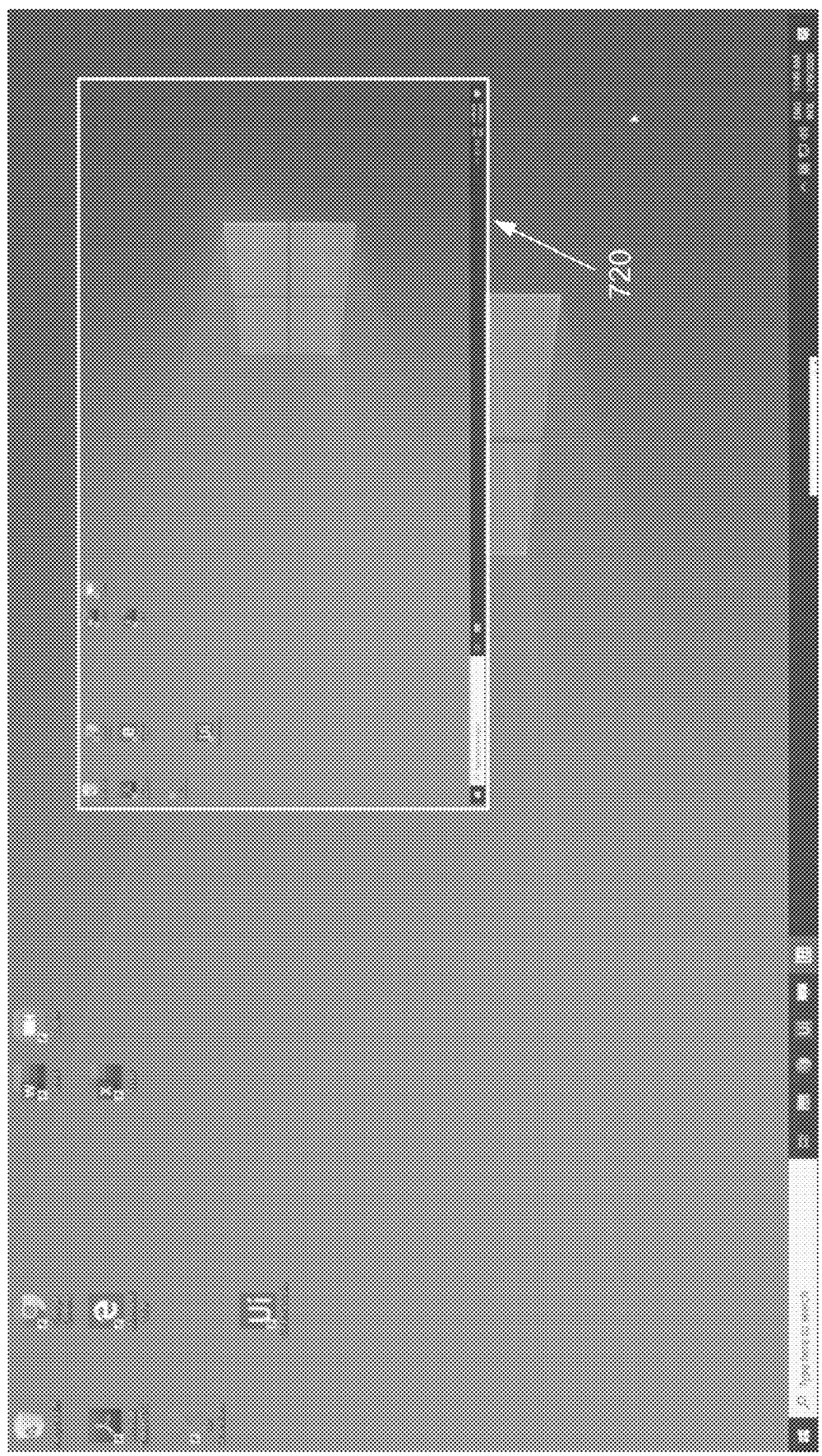

FIGS. 7A-K are screenshots illustrating an example of separate sessions for a user and a robot for RPA, according to an embodiment of the present invention. In FIG. 7A, a user session window 700 is shown, where a user is able to interact with applications in the UI and no robot is currently executing. In FIG. 7B, the user pulls up a robot tray 710 (e.g., by clicking an icon at the bottom right of the screen) and selects a robot to execute on his or her computing system. After selecting the robot to be executed, as shown in FIG. 7C, a robot session window 720 appears as a child window on the screen. The robot will operate in robot session window 720.

Figure 7D:
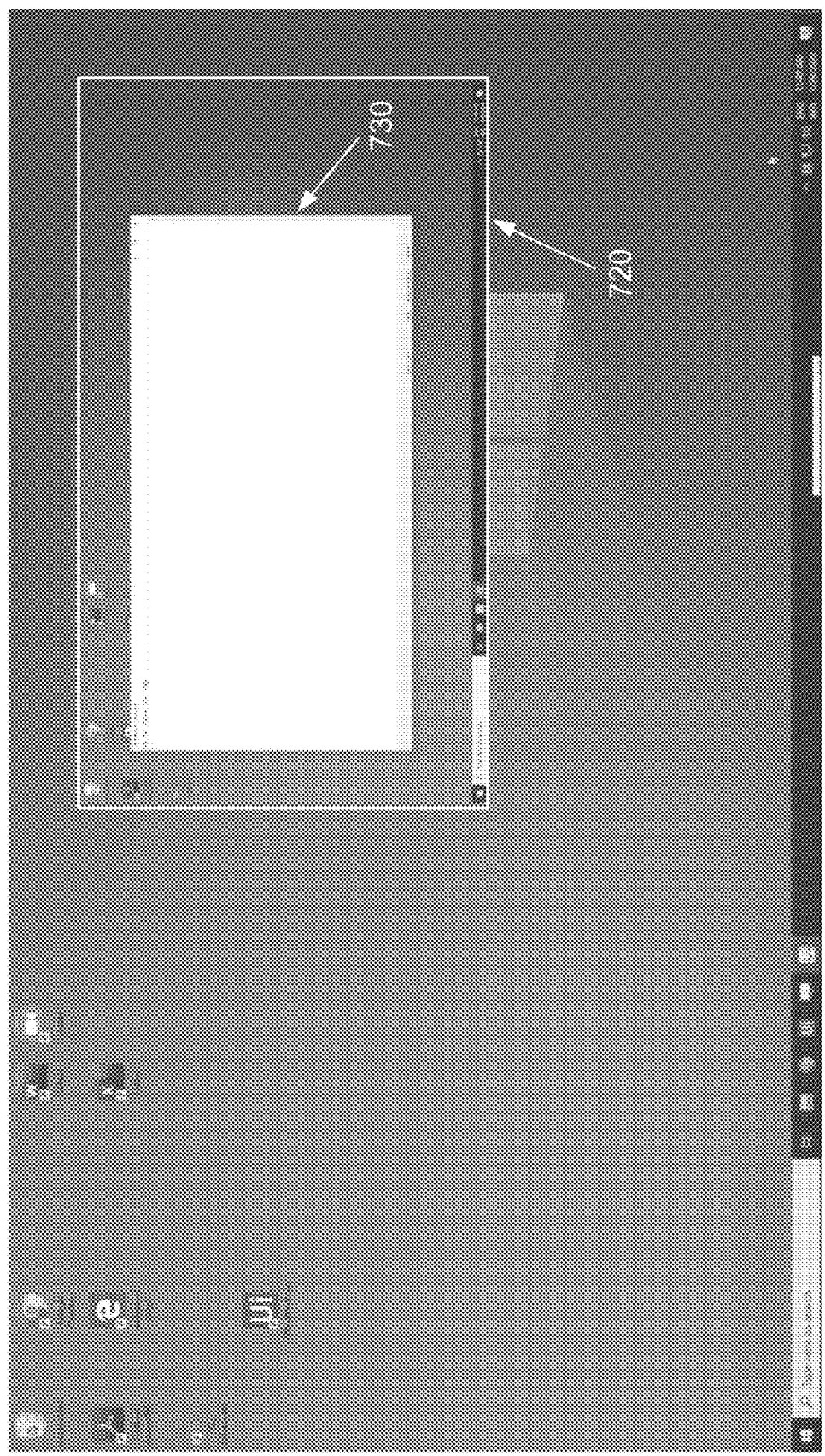
Figure 7E:
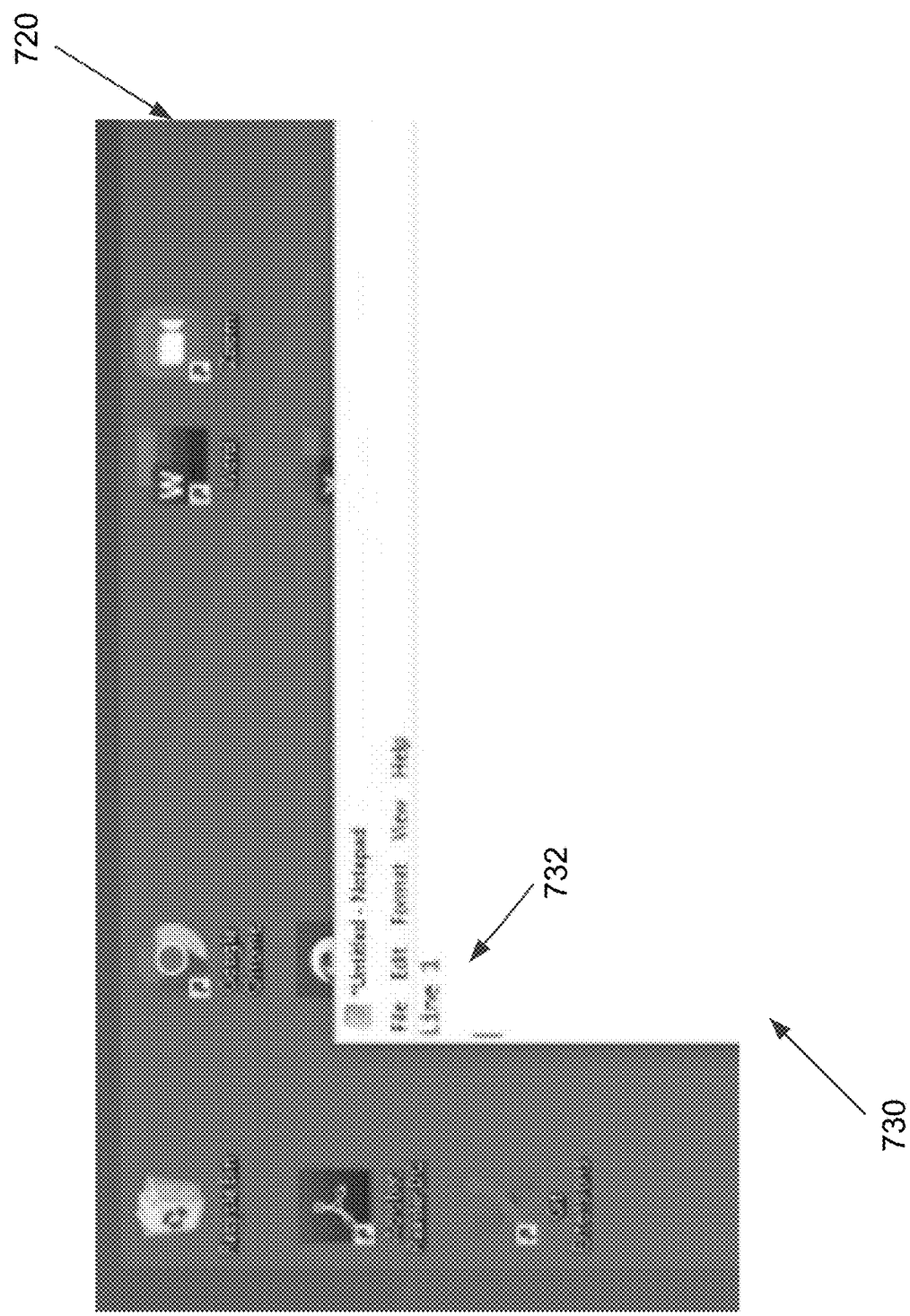
Figure 7F:
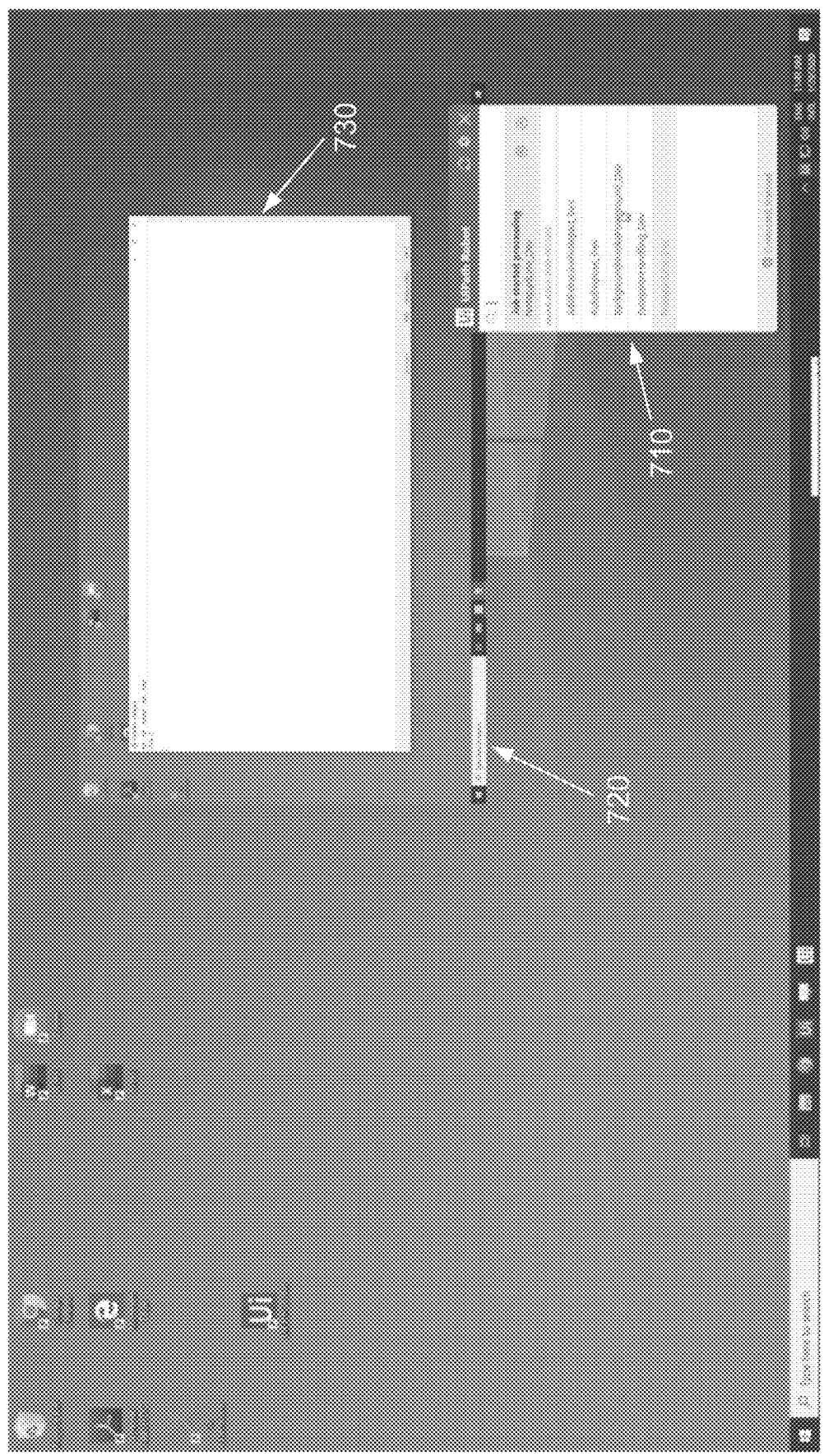

Turning to FIGS. 7D and 7E (which is an enlarged view of a portion of FIG. 7D), in this example, the robot launches the Microsoft Notepad® application 730 and begins entering text 732 therein. While this is occurring, the user can interact with applications in user session window 700, move, resize, or minimize robot session window 720, etc. As shown in FIG. 7F, robot tray 710 indicates that the robot is running.

Figure 7H:
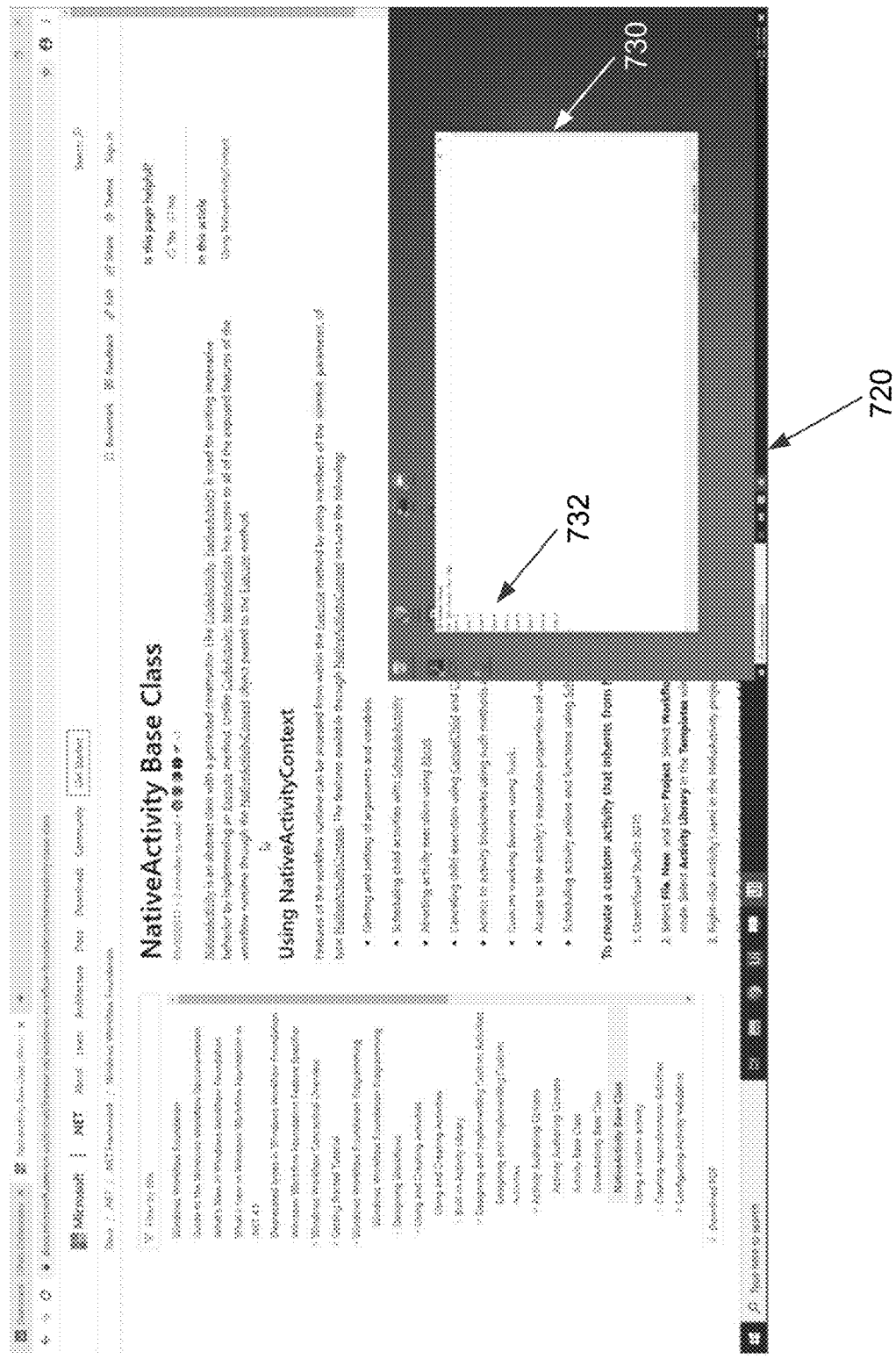

In FIG. 7G, the user has opened Google Chrome® within user session window 700. Robot session window 720 is visible in the foreground. In FIG. 7H and the enlarged portion thereof shown in FIG. 7I, as the user navigates the web using Google Chrome®, the robot continues to enter text 732 in Microsoft Notepad® application 730 in parallel with the user's web navigation.

Figure 7J:
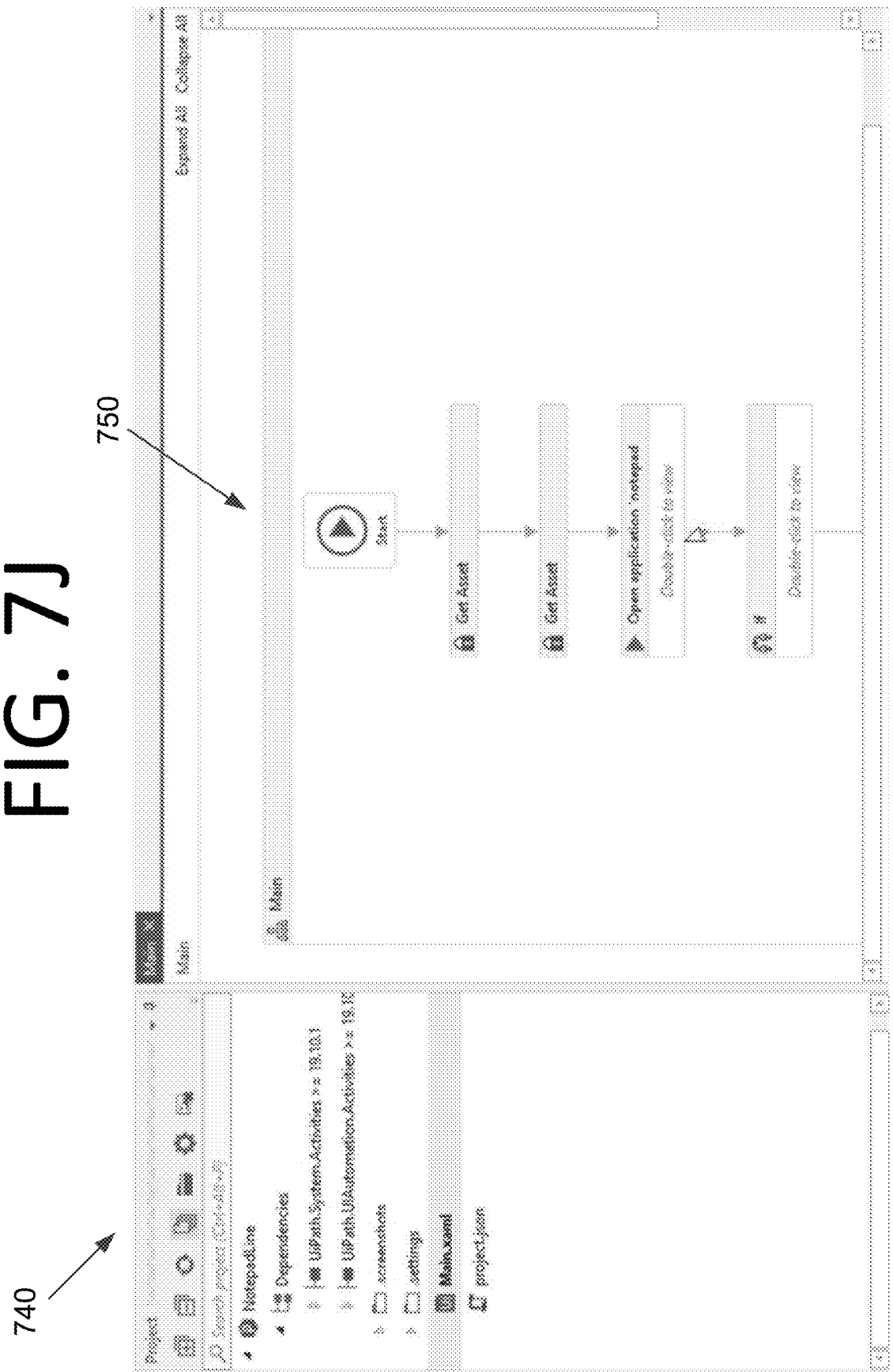
Figure 7K:
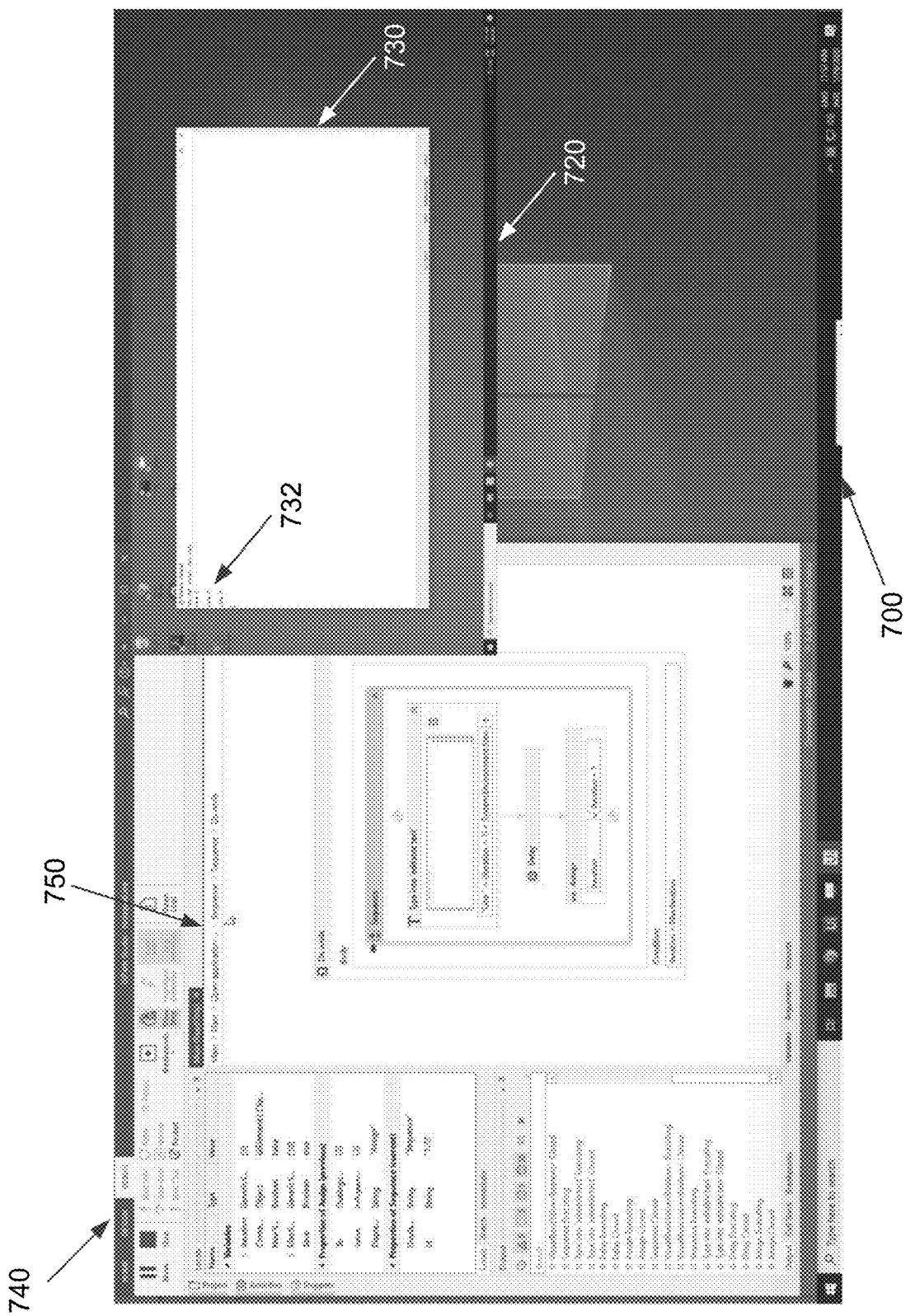

FIG. 7J illustrates UiPath Studio™ 740 with part of an RPA workflow 750 for the robot. As can be seen in FIG. 7K, a developer is able to step through RPA workflow 750 using UiPath Studio™ 740. UiPath Studio™ 740 and robot session window 720 are both visible in user session window 700. With each step, text 732 is entered in Microsoft Notepad® application 730.

Figure 8:
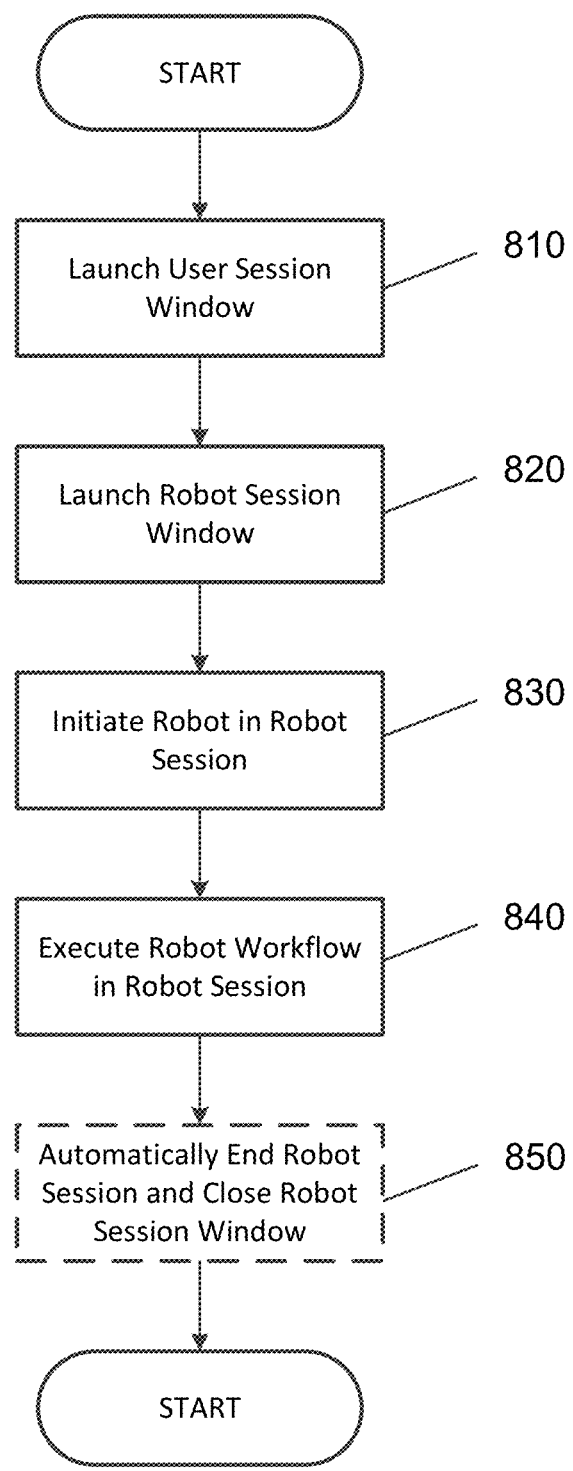
FIG. 8 is a flowchart illustrating a process for enabling a robot and a user to operate a computing system simultaneously using attended automation windows, according to an embodiment of the present invention.

FIG. 8 is a flowchart illustrating a process 800 for enabling a robot and a user to operate a computing system simultaneously using attended automation windows, according to an embodiment of the present invention. The process begins with launching a user session window at 810. This may be the main window associated with the operating system running on the user computing system, for example. A robot session window is then launched as a child window of the user session window at 820. In some embodiments, the robot session window may be launched responsive to the robot being initiated or otherwise launched, for example. The robot is then initiated in the robot session at 830 and the robot executes its workflow in the robot session at 840. In some embodiments, the robot session is ended and the robot session window is closed automatically at 850.

In some embodiments, the child session may be created via a child session API of the operating system. Windows® Terminal Services Child Sessions or another child session API provided by an operating system may be used in some embodiments to create the second session without deviating from the scope of the invention. The robot tray application (e.g., the UiPath® Robot Agent Desktop) may then use the create process APIs in the operating system with the appropriate arguments to start the robot process in that child session. The robot tray application may then communicate with the robot process using a suitable protocol (e.g., one built on named pipes).

Communication with the robot between the two sessions may be accomplished using IPC protocols. These protocols may facilitation communication via the network, pipes, Component Object Model (COM), Remote Procedure Calls (RPC), sockets, etc. Suitable session creation mechanisms and IPC protocols may be used for other operating systems as well, where supported. When the user clicks a button on the robot tray, the robot tray application may send that command to the robot process using the IPC protocol. The robot may send status notifications back to the robot tray application (e.g., indicating that the robot is starting, running, paused, etc.) via the IPC protocol as well.

Attended Automation for RPA Developers (Design Time)

In some embodiments, an attended automation window may create a second session to host and run attended automations therein for the purposes of testing and debugging automations when used from a development environment at design time. This may enable RPA developers to ensure that attended automations running inside the robot attended automation window behave as intended.

RPA developers may also use this functionality to create attended automations that provide a smooth experience where users can access applications as desired while the robot is running. If an attended automation makes it difficult for a user to interact with his or her computing system while running, or if it is difficult for RPA developers who launch the attended automation from an integrated development environment (IDE) to view and access the IDE while the attended automation is running, it may be desirable for the RPA developer to modify the robot to run in a less intrusive manner. For example, if the automation brings an application to the foreground in front of the IDE, the developer loses the ability to view the logging information streaming from the process in real time. The RPA developer may thus change launch settings from the IDE so this does not occur.

Figure 9:
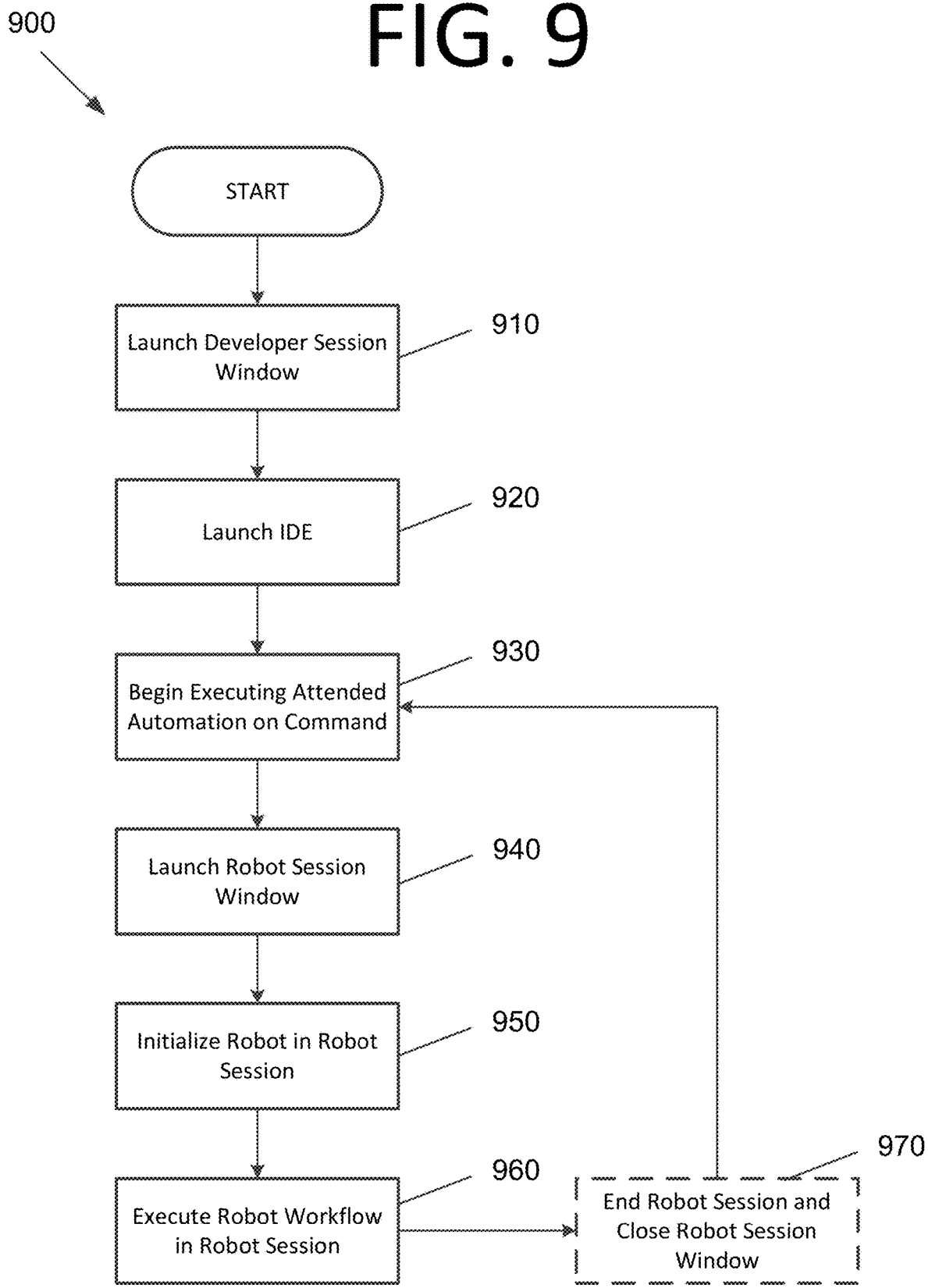
FIG. 9 is a flowchart illustrating a process for enabling a robot and an RPA developer to operate a computing system simultaneously using attended automation windows, according to an embodiment of the present invention.

FIG. 9 is a flowchart illustrating a process 900 for enabling a robot and an RPA developer to operate a computing system simultaneously using attended automation windows, according to an embodiment of the present invention. The process begins with launching a developer session window at 910. This may be the main window associated with the operating system running on the RPA developer computing system, for example. Next, an IDE is launched at 920, and the RPA developer issues a command to start the attended automation at 930. This causes the robot session window to launch at 940 and the robot is initialized in the robot session at 950. The robot then executes its workflow in the robot session at 960 to carry out the attended automation logic. If the developer is not satisfied with the operation of the robot, the developer may commend execution to stop in the IDE, which ends the robot session and closes the robot session window at 970. The process then returns to step 930.

Automation Monitoring for RPA

In some embodiments, the second session may be used for automation monitoring and troubleshooting. For instance, an operations engineer responsible for a server that is hosting unattended automations (i.e., there is no licensing requirement or expectation by the automation process that a user is monitoring execution) may desire to intervene to correct errors. The operations engineer may do this via the second session window. For instance, the operations engineer may step in and kill operation of the robot(s) where errors are occurring.

In some embodiments, the operations engineer may access the computing system using a remote desktop technology. For example, the operations engineer may be logged into the computing system (e.g., a production machine) and able to see the user interface thereof on his or her own computing system. Thus, the operations engineer may be able to see the UI and control the remote computing system as desired.

The robot may be running and controlling the UI in the second session on a production machine. This means that the operations engineer is freed to do things like monitor the streaming logs coming from the robot and visually monitor a UI being driven by the robot (if any) without losing control of the machine. Because the robot control software is running in the first or parent session, if a problem occurs, the engineer is able to pause/terminate/resume execution from the parent session that he or she is logged into. In some embodiments, the robot may be running in the parent session and the monitoring may be performed from the child session.

The Microsoft® Universal Windows Platforms (UWP) Simulator provides the ability to simulate behaviors such as geolocation, multi-touch, rotation, etc. Such behaviors can be difficult or impossible to test on a developer machine. For instance, if the developer wants to test behaviors of an application that depends on different locations, such as a map program, it is highly inconvenient for the developer to carry his or her computer around the country or world for testing. Rather than being focused on isolating "UI takeover" from the user, or being exclusively related to RPA, UWP applications are single applications contained in a single window. As such, the need to isolate UI control should not be an issue. The UWP simulator therefore may solve the "simulation scenarios" for a single application.

Figure 10:
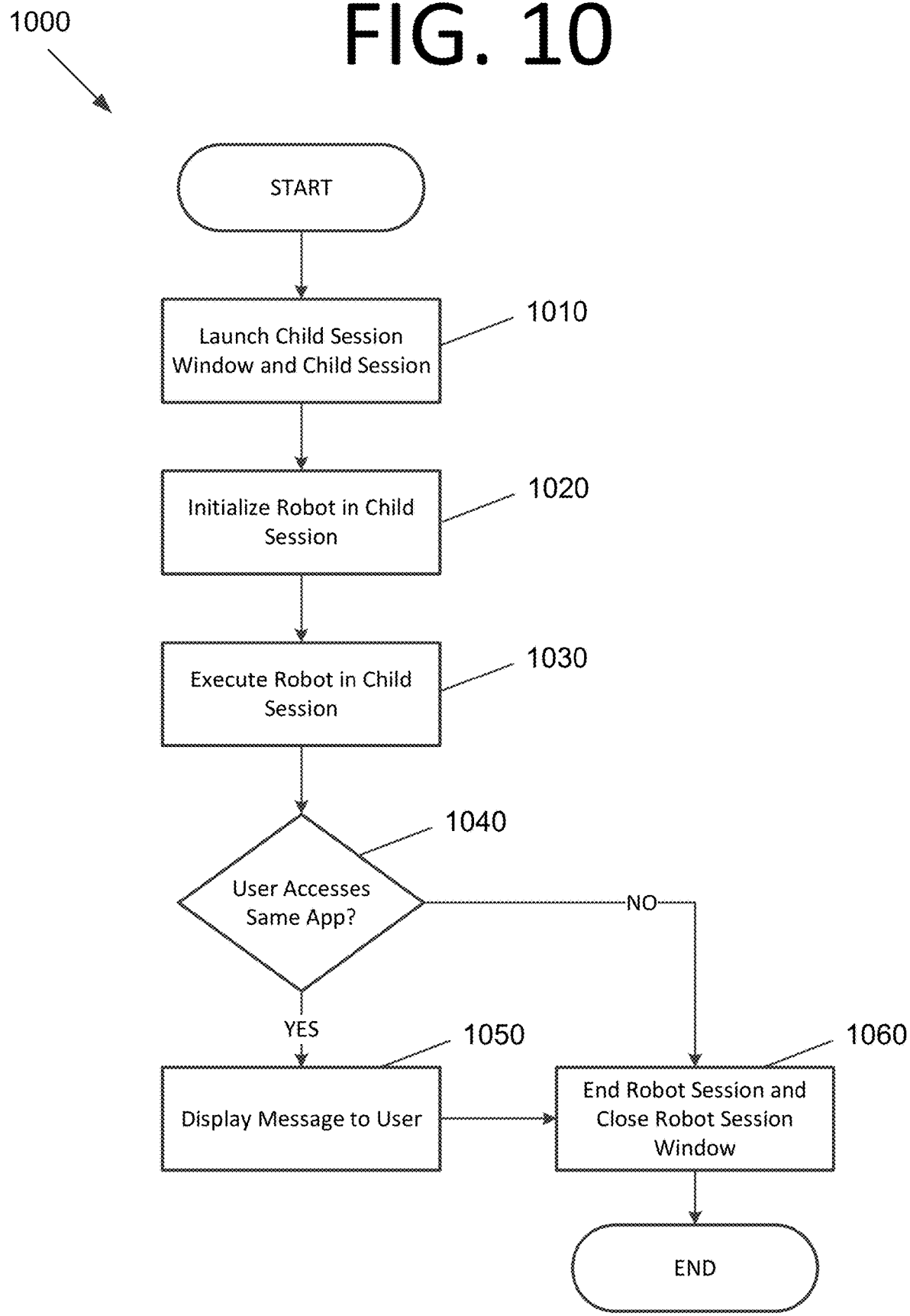
FIG. 10 is a flowchart illustrating a process for performing attended or unattended automation using automation windows for users, according to an embodiment of the present invention.

FIG. 10 is a flowchart illustrating a process 1000 for performing attended or unattended automation using automation windows for users, according to an embodiment of the present invention. The process begins with launching a child session window and a child session at 1010. The child session is a child of a parent session for an operating system and the child window is located within a parent window of the parent session. An RPA robot is initialized in the child session as a process at 1020 and the RPA robot is executed at 1030. During execution, the RPA robot executes an RPA workflow including a plurality of activities within the child session window. The parent session and the child session have access to a common file system.

If the user attempts to access the same application as the RPA robot at 1040, a message is displayed to the user in the parent session window at 1050 indicating that the RPA robot is currently accessing the application. The child session is automatically ended and the child session window is automatically closed after the RPA robot completes execution of the RPA workflow at 1060. Steps 1010-1060 may be repeated for any desired number of robots executing in child sessions in serial or in parallel.

In some embodiments, when executing the plurality of activities in the RPA workflow, the RPA robot interacts with one or more common applications running on a computing system that are accessible via both the parent session and the child session. In certain embodiments, the RPA robot is an attended robot and a user interacting with an instance of an application via the parent session does not interfere with the RPA robot interacting with a different instance of the application or an instance of a different application via the child session. In some embodiments, the child session window is launched from a robot tray application in the parent session window. In certain embodiments, communication between the robot tray application and the RPA robot is accomplished using an IPC protocol and the robot tray application is configured to send commands to the RPA robot process via the IPC protocol. In some embodiments, the RPA robot is configured to send status notifications to the robot tray application via the IPC protocol.

In some embodiments, the parent and child sessions are launched at design time, the RPA robot performs an attended automation, and an IDE application executes on a computing system associated with the parent session and is configured to initiate the attended automation. In certain embodiments, the parent session and the child session run on different computing systems. In some embodiments, the parent window, the child window, or both, include a window representing a UI displayed within a main UI, a second screen of a second display of a computing system, a virtual desktop, or an isolated environment.

In some embodiments, the RPA robot is an attended robot and the RPA robot is initialized and executed in the parent session while a user interacts with the parent session. In certain embodiments, the launching of the child session window and the child session, the initialization of the RPA robot in the child session, and the execution of the RPA robot are performed via a remote computing system. In some embodiments, the RPA robot is an unattended robot.

Figure 11:
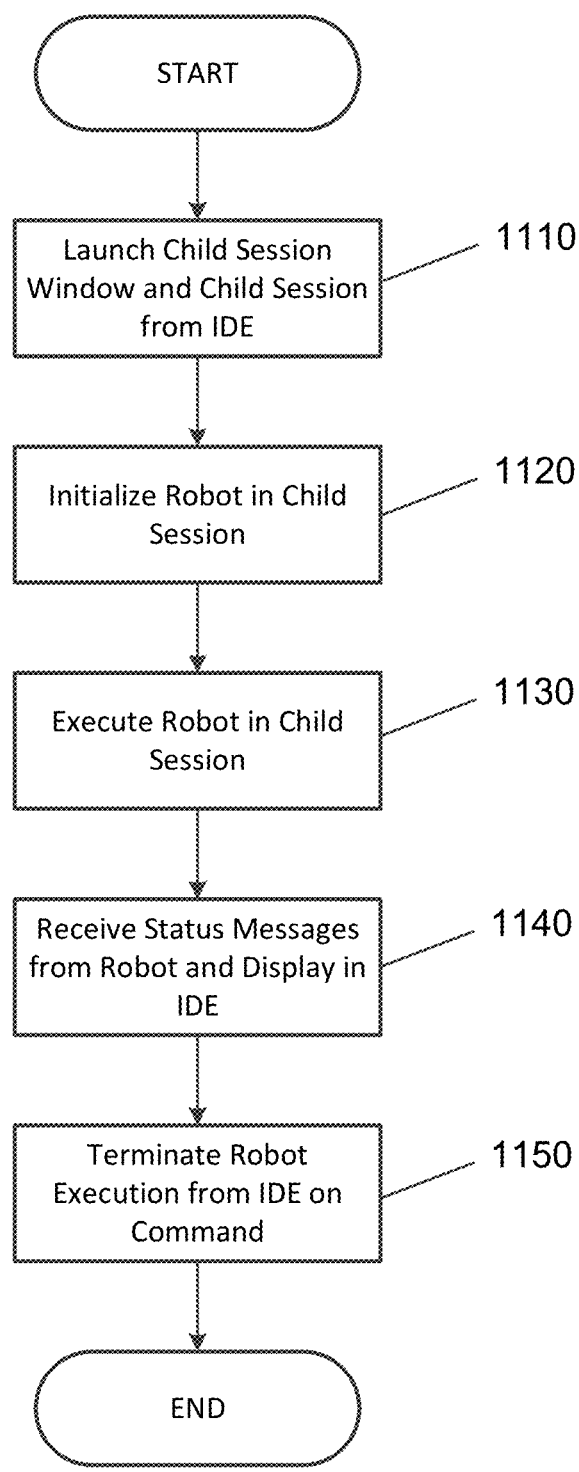
FIG. 11 is a flowchart illustrating a process for performing attended or unattended automation using automation windows for RPA developers, according to an embodiment of the present invention.

FIG. 11 is a flowchart illustrating a process 1100 for performing attended or unattended automation using automation windows for RPA developers, according to an embodiment of the present invention. The process begins with launching a child session window and a child session from an IDE at 1110. The child session is a child of a parent session for an operating system and the child window is located within a parent window of the parent session. An RPA robot is initialized in the child session as a process at 1120 and the RPA robot is executed at 1130. During execution, the RPA robot executes an RPA workflow including a plurality of activities within the child session window. The parent session and the child session have access to a common file system.

Status messages are received from the RPA robot during robot operation and the received status messages are displayed in the IDE at 1140. If the robot is not operating as intended, a user (e.g., an RPA developer) may wish to end its operation. When the user provides a command to terminate operation of the RPA robot, operation of the RPA robot, the child session, and the child window is terminated by the IDE.

FIG. 12 is a flowchart illustrating a process 1200 for performing automation monitoring, according to an embodiment of the present invention. The process beings with initializing and executing a monitoring and troubleshooting application in a parent session associated with a computing system at 1210. A child session window and a child session are launched at 1220. The child session is a child of the parent session for an operating system.

An unattended RPA robot is initialized and executed in the child session as a process at 1230. A command is received from a user of the monitoring and troubleshooting application to terminate operation of the unattended RPA robot at 1240. Operation of the unattended RPA robot is then paused or terminated at 1250 and the child session and child session window are killed at 1260 responsive to receiving the command. The parent session and the child session have access to a common file system.

In some embodiments, the child session window is displayed on a different computing system than the parent session is executing on. In certain embodiments, when executing a plurality of activities in an RPA workflow, the unattended RPA robot interacts with one or more common applications that are accessible via both the parent session and the child session. In some embodiments, the interactions of the user with an instance of an application via the parent session does not interfere with the unattended RPA robot interacting with a different instance of the application or an instance of a different application via the child session. In certain embodiments, the child session is automatically ended and the child session window is automatically closed after the unattended RPA robot completes execution of an RPA workflow.

In some embodiments, any desired number of additional robots may be executed in respective child sessions in serial or in parallel with that of step 1220. In certain embodiments, when the user attempts to interact with an application that the unattended RPA robot is interacting with, a message may be displayed to the user in the parent session window indicating that the unattended RPA robot is currently accessing the application. In some embodiments, the parent session and the child session run on different computing systems. In certain embodiments, the parent window, the child window, or both, comprise a window representing a UI displayed within a main UI, a second screen of a second display of a computing system, a virtual desktop, or an isolated environment. In some embodiments, the launching of the child session window and the child session, the initialization of the unattended RPA robot in the child session, and the execution of the unattended RPA robot are performed via a remote computing system.

The process steps performed in FIGS. 8-12 may be performed by a computer program, encoding instructions for the processor(s) to perform at least part of the process(es) described in FIGS. 8-12, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 8-12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program product embodied on a non-transitory computer-readable medium, the program configured to cause at least one processor to:
    launch a child session window and a child session, wherein the child session is a child of a parent session for an operating system and the child window is located within a parent window of the parent session;
    initialize a robotic process automation (RPA) robot in the parent session as a process; and
    execute the RPA robot, wherein
    during execution, the RPA robot executes an RPA workflow comprising a plurality of activities within the parent session,
    the parent session and the child session have access to a common file system, and
    the RPA robot is an attended robot and a user interacting with an instance of an application via the child session does not interfere with the RPA robot interacting with a different instance of the application or an instance of a different application via the parent session.

2. The computer program product of claim 1, wherein when executing the plurality of activities in the RPA workflow, the RPA robot interacts with one or more common applications running on a computing system that are accessible via both the parent session and the child session.

3. The computer program product of claim 1, wherein the computer program is further configured to cause the at least one processor to:
    initialize another RPA robot in the parent session; and
    execute the other RPA robot.

4. The computer program product of claim 1, wherein when the RPA robot is an attended robot and a user attempts to interact with an application that the RPA robot is interacting with, the computer program is further configured to cause the at least one processor to:
    display a message to the user in the child session window indicating that the RPA robot is currently accessing the application.

5. The computer program product of claim 1, wherein the parent and child sessions are launched at design time, the RPA robot performs an attended automation, and an integrated development environment (IDE) application executes on a computing system associated with the child session and is configured to initiate the attended automation.

6. The computer program product of claim 1, wherein the parent session and the child session run on different computing systems.

7. The computer program of product claim 1, wherein the parent session window, the child session window, or both, comprise a window representing a user interface (UI) displayed within a main UI, a second screen of a second display of a computing system, a virtual desktop, or an isolated environment.

8. The computer program product of claim 1, wherein the launching of the child session window and the child session, the initialization of the RPA robot in the parent session, and the execution of the RPA robot are performed via a remote computing system.

9. The computer program of claim 1, wherein the RPA robot is an unattended robot.

10. A computer-implemented method for performing attended automation for robotic process automation (RPA) at design time, comprising:

launching a child session window and a child session from an integrated development environment (IDE), wherein the child session is a child of a parent session for an operating system and the child window is located within a parent window of the parent session;

initializing a robotic process automation (RPA) robot in the parent session as a process; and executing the RPA robot, wherein a user operates in the child session, during execution, the RPA robot executes an RPA workflow comprising a plurality of activities within the parent session, the parent session and the child session have access to a common file system, and the RPA robot is an attended robot and a user interacting with an instance of an application via the child session does not interfere with the RPA robot interacting with a different instance of the application or an instance of a different application via the parent session.

11. The computer-implemented method of claim 10, further comprising:

receiving status messages from the RPA robot during robot operation; and displaying the status messages in the IDE.

12. The computer-implemented method of claim 10, wherein when the user provides a command to terminate operation of the RPA robot, the method further comprises:

terminating operation of the RPA robot.

13. A computer program product embodied on a non-transitory computer-readable medium, the program configured to cause at least one processor to:

launch a child session window and a child session, wherein the child session is a child of a parent session for an operating system and the child window is located within a parent window of the parent session;

initialize a robotic process automation (RPA) robot in the parent session as a process; and execute the RPA robot, wherein a user operates in the child session, during execution, the RPA robot executes an RPA workflow comprising a plurality of activities within the parent session, the RPA robot is an unattended robot, and the parent session and the child session have access to a common file system, the RPA robot is an attended robot and a user interacting with an instance of an application via the child session does not interfere with the RPA robot interacting with a different instance of the application or an instance of a different application via the parent session.

14. The computer program product of claim 13, wherein when executing the plurality of activities in the RPA workflow, the RPA robot interacts with one or more common applications running on a computing system that are accessible via both the parent session and the child session.

15. The computer program product of claim 13, wherein the computer program is further configured to cause the at least one processor to:

initialize another RPA robot in the parent session; and execute the other RPA robot.

16. The computer program product of claim 13, wherein when the user attempts to interact with an application that the RPA robot is interacting with, the computer program is further configured to cause the at least one processor to:

display a message to the user in the child session window indicating that the RPA robot is currently accessing the application.

17. The computer program product of claim 13, wherein the parent session and the child session run on different computing systems.

18. The computer program product of claim 13, wherein the parent session window, the child session window, or both, comprise a window representing a user interface (UI) displayed within a main UI, a second screen of a second display of a computing system, a virtual desktop, or an isolated environment.

19. The computer program product of claim 13, wherein the launching of the child session window and the child session, the initialization of the RPA robot in the parent session, and the execution of the RPA robot are performed via a remote computing system.

* * * * *